(12) United States Patent
Joshi et al.

(10) Patent No.: US 10,359,972 B2
(45) Date of Patent: *Jul. 23, 2019

(54) SYSTEMS, METHODS, AND INTERFACES FOR ADAPTIVE PERSISTENCE

(71) Applicant: SanDisk Technologies LLC, Plano, TX (US)

(72) Inventors: Vikram Joshi, Los Gatos, CA (US); David Flynn, Sandy, UT (US); Yang Luan, San Jose, CA (US); Michael F. Brown, Campbell, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,835

(22) Filed: Mar. 14, 2013

(65) Prior Publication Data

US 2014/0068183 A1 Mar. 6, 2014

Related U.S. Application Data

(60) Provisional application No. 61/696,126, filed on Aug. 31, 2012.

(51) Int. Cl.
*G06F 3/06* (2006.01)
*G06F 12/0877* (2016.01)
(Continued)

(52) U.S. Cl.
CPC ............ *G06F 3/0662* (2013.01); *G06F 3/061* (2013.01); *G06F 3/0659* (2013.01);
(Continued)

(58) Field of Classification Search
CPC ............. G06F 12/1088; G06F 12/0868; G06F 12/0877; G06F 21/00;
(Continued)

(56) References Cited

U.S. PATENT DOCUMENTS

| | | |
|---|---|---|
| 4,571,674 A | 2/1986 | Hartung |
| 5,043,871 A | 8/1991 | Nishigaki et al. |

(Continued)

FOREIGN PATENT DOCUMENTS

| | | | |
|---|---|---|---|
| CA | 2761553 A1 * | 6/2013 | ............ G06F 12/00 |
| CN | 1771495 | 5/2006 | |

(Continued)

OTHER PUBLICATIONS

Luo et al. "S-CAVE: Effective SSD Caching to Improve Virtual Machine Storage Performance". Proceedings of the 22Nd International Conference on Parallel Architectures and Compilation Techniques. IEEE 2013. pp. 103-112.*

(Continued)

*Primary Examiner* — Tracy A Warren
(74) *Attorney, Agent, or Firm* — Kunzler Bean & Adamson, PC

(57) ABSTRACT

A storage module may be configured to service I/O requests according to different persistence levels. The persistence level of an I/O request may relate to the storage resource(s) used to service the I/O request, the configuration of the storage resource(s), the storage mode of the resources, and so on. In some embodiments, a persistence level may relate to a cache mode of an I/O request. I/O requests pertaining to temporary or disposable data may be serviced using an ephemeral cache mode. An ephemeral cache mode may comprise storing I/O request data in cache storage without writing the data through (or back) to primary storage. Ephemeral cache data may be transferred between hosts in response to virtual machine migration.

20 Claims, 15 Drawing Sheets

(51) Int. Cl.
*G06F 12/0842* (2016.01)
*G06F 12/0866* (2016.01)
*G06F 12/0888* (2016.01)
*G06F 12/0804* (2016.01)

(52) U.S. Cl.
CPC .......... *G06F 3/0664* (2013.01); *G06F 3/0671* (2013.01); *G06F 3/0689* (2013.01); *G06F 12/0842* (2013.01); *G06F 12/0866* (2013.01); *G06F 12/0877* (2013.01); *G06F 12/0888* (2013.01); *G06F 12/0804* (2013.01); *G06F 2212/151* (2013.01); *G06F 2212/6042* (2013.01)

(58) Field of Classification Search
CPC .. G06F 9/455–9/45558; G06F 9/45533; G06F 2009/45562–2009/45595
USPC .................................................. 711/118, 135
See application file for complete search history.

(56) References Cited

U.S. PATENT DOCUMENTS

| | | | |
|---|---|---|---|
| 5,191,184 A | 3/1993 | Belsan et al. | |
| 5,261,068 A | 9/1993 | Gaskins et al. | |
| 5,291,496 A | 3/1994 | Andaleon et al. | |
| 5,307,497 A | 4/1994 | Feigenbaum | |
| 5,313,475 A | 5/1994 | Cromer et al. | |
| 5,325,509 A | 6/1994 | Lautzenhaiser | |
| 5,392,244 A * | 2/1995 | Jacobson ............ | G06F 11/1076 711/114 |
| 5,392,427 A | 2/1995 | Barrett et al. | |
| 5,404,485 A | 4/1995 | Ban | |
| 5,434,994 A | 7/1995 | Shaheen et al. | |
| 5,438,671 A | 8/1995 | Miles | |
| 5,469,555 A | 11/1995 | Ghosh et al. | |
| 5,499,354 A | 3/1996 | Aschoff et al. | |
| 5,504,882 A | 4/1996 | Chai | |
| 5,535,399 A | 7/1996 | Blitz et al. | |
| 5,551,003 A | 8/1996 | Mattson et al. | |
| 5,553,261 A | 9/1996 | Hasbun et al. | |
| 5,559,988 A | 9/1996 | Durante et al. | |
| 5,586,291 A | 12/1996 | Lasker et al. | |
| 5,594,883 A | 1/1997 | Pricer | |
| 5,596,736 A | 1/1997 | Kerns | |
| 5,598,370 A | 1/1997 | Nijima et al. | |
| 5,651,133 A | 7/1997 | Burkes | |
| 5,680,579 A | 10/1997 | Young et al. | |
| 5,682,497 A | 10/1997 | Robinson | |
| 5,682,499 A | 10/1997 | Bakke et al. | |
| 5,603,001 A | 11/1997 | Sukegawa et al. | |
| 5,701,434 A | 12/1997 | Nakagawa | |
| 5,734,861 A | 3/1998 | Cohn et al. | |
| 5,745,792 A | 4/1998 | Jost | |
| 5,754,563 A | 5/1998 | White | |
| 5,757,567 A | 5/1998 | Hetzler et al. | |
| 5,787,486 A | 7/1998 | Chin et al. | |
| 5,802,602 A | 9/1998 | Rahman et al. | |
| 5,809,527 A | 9/1998 | Cooper et al. | |
| 5,809,543 A | 9/1998 | Byers et al. | |
| 5,845,313 A | 12/1998 | Estakhri et al. | |
| 5,845,329 A | 12/1998 | Onishi et al. | |
| 5,860,083 A | 1/1999 | Sukegawa | |
| 5,907,856 A | 5/1999 | Estakhri et al. | |
| 5,961,660 A | 5/1999 | Capps, Jr. et al. | |
| 5,924,113 A | 7/1999 | Estakhri et al. | |
| 5,957,158 A | 9/1999 | Volz et al. | |
| 5,960,462 A | 9/1999 | Solomon et al. | |
| 5,930,815 A | 10/1999 | Estakhri et al. | |
| 6,000,019 A | 12/1999 | Dykstal et al. | |
| 6,014,724 A | 1/2000 | Jennett | |
| 6,128,695 A | 3/2000 | Estakhri et al. | |
| 6,073,232 A | 6/2000 | Kroeker et al. | |
| 6,092,159 A * | 7/2000 | Ekner .................. | G06F 12/0802 711/133 |
| 6,101,601 A | 8/2000 | Matthews et al. | |
| 6,141,249 A | 11/2000 | Estakhri et al. | |
| 6,145,051 A | 11/2000 | Estakhri et al. | |
| 6,170,039 B1 | 1/2001 | Kishida | |
| 6,170,047 B1 | 1/2001 | Dye | |
| 6,172,906 B1 | 1/2001 | Estakhri et al. | |
| 6,173,381 B1 | 1/2001 | Dye | |
| 6,185,654 B1 | 2/2001 | Van Doren | |
| 6,209,088 B1 | 3/2001 | Reneris | |
| 6,223,308 B1 | 4/2001 | Estakhri et al. | |
| 6,230,234 B1 | 5/2001 | Estakhri et al. | |
| 6,236,593 B1 | 5/2001 | Hong et al. | |
| 6,240,040 B1 | 5/2001 | Akaogi et al. | |
| 6,256,642 B1 | 7/2001 | Krueger et al. | |
| 6,266,785 B1 | 7/2001 | McDowell | |
| 6,279,069 B1 | 8/2001 | Robinson et al. | |
| 6,289,413 B1 | 9/2001 | Rogers et al. | |
| 6,330,688 B1 | 12/2001 | Brown | |
| 6,336,174 B1 | 1/2002 | Li et al. | |
| 6,356,986 B1 | 3/2002 | Solomon et al. | |
| 6,370,631 B1 | 4/2002 | Dye | |
| 6,385,710 B1 | 5/2002 | Goldman et al. | |
| 6,393,513 B2 | 5/2002 | Estakhri et al. | |
| 6,404,647 B1 | 6/2002 | Minne | |
| 6,412,080 B1 | 6/2002 | Fleming et al. | |
| 6,418,478 B1 | 7/2002 | Ignatius et al. | |
| 6,507,911 B1 | 1/2003 | Langford | |
| 6,516,380 B2 | 2/2003 | Kenchammana-Hoskote et al. | |
| 6,523,102 B1 | 2/2003 | Dye et al. | |
| 6,564,285 B1 | 5/2003 | Mills et al. | |
| 6,567,889 B1 | 5/2003 | DeKoning et al. | |
| 6,587,915 B1 | 7/2003 | Kim | |
| 6,601,211 B1 | 7/2003 | Norman | |
| 6,625,685 B1 | 9/2003 | Cho et al. | |
| 6,629,112 B1 | 9/2003 | Shank | |
| 6,658,438 B1 | 12/2003 | Moore et al. | |
| 6,671,757 B1 | 12/2003 | Multer et al. | |
| 6,675,349 B1 | 1/2004 | Chen | |
| 6,715,027 B2 | 3/2004 | Kim et al. | |
| 6,715,046 B1 | 3/2004 | Shoham et al. | |
| 6,728,851 B1 | 4/2004 | Estakhri et al. | |
| 6,751,155 B2 | 6/2004 | Gorobets | |
| 6,754,774 B2 | 6/2004 | Gruner et al. | |
| 6,757,800 B1 | 6/2004 | Estakhri et al. | |
| 6,775,185 B2 | 8/2004 | Fujisawa et al. | |
| 6,779,088 B1 | 8/2004 | Benveniste et al. | |
| 6,779,094 B2 | 8/2004 | Selkirk et al. | |
| 6,785,776 B2 | 8/2004 | Arimilli et al. | |
| 6,785,785 B2 | 8/2004 | Piccirillo et al. | |
| 6,801,979 B1 | 10/2004 | Estakhri | |
| 6,804,755 B2 | 10/2004 | Selkirk et al. | |
| 6,877,076 B1 | 4/2005 | Cho et al. | |
| 6,880,049 B2 | 4/2005 | Gruner et al. | |
| 6,883,069 B2 | 4/2005 | Yoshida | |
| 6,883,079 B1 | 4/2005 | Priborsky | |
| 6,910,170 B2 | 6/2005 | Choi et al. | |
| 6,912,537 B2 | 6/2005 | Selkirk et al. | |
| 6,912,618 B2 | 6/2005 | Estakhri et al. | |
| 6,938,133 B2 | 8/2005 | Johnson et al. | |
| 6,957,158 B1 | 10/2005 | Hancock et al. | |
| 6,959,369 B1 | 10/2005 | Ashton et al. | |
| 6,977,599 B2 | 12/2005 | Widmer | |
| 6,978,342 B1 | 12/2005 | Estakhri et al. | |
| 6,981,070 B1 | 12/2005 | Luk et al. | |
| 6,986,015 B2 * | 1/2006 | Testardi ................. | 711/202 |
| 6,996,676 B2 | 2/2006 | Megiddo | |
| 7,010,652 B2 | 3/2006 | Piccirillo et al. | |
| 7,010,662 B2 | 3/2006 | Aasheim et al. | |
| 7,013,376 B2 | 3/2006 | Hooper, III | |
| 7,013,379 B1 | 3/2006 | Testardi | |
| 7,035,974 B2 | 4/2006 | Shang | |
| 7,043,599 B1 | 5/2006 | Ware et al. | |
| 7,047,366 B1 | 5/2006 | Ezra | |
| 7,050,337 B2 | 5/2006 | Iwase et al. | |
| 7,058,769 B1 | 6/2006 | Danilak | |
| 7,076,599 B2 | 7/2006 | Aasheim et al. | |
| 7,076,723 B2 | 7/2006 | Saliba | |
| 7,082,495 B2 | 7/2006 | DeWhitt et al. | |
| 7,082,512 B2 | 7/2006 | Aasheim et al. | |

(56) References Cited

U.S. PATENT DOCUMENTS

| | | |
|---|---|---|
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,197,657 B1 | 5/2007 | Tobias |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,415,591 B1 | 8/2008 | Todd |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,472,225 B2 | 12/2008 | Varma et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,664,239 B2 | 1/2010 | Groff et al. |
| 7,660,911 B2 | 2/2010 | McDaniel |
| 7,660,941 B2 | 2/2010 | Lee et al. |
| 7,669,019 B2 | 2/2010 | Fujibayashi et al. |
| 7,676,628 B1 | 3/2010 | Compton et al. |
| 7,694,065 B2 | 4/2010 | Petev et al. |
| 7,702,873 B2 | 4/2010 | Griess et al. |
| 7,840,839 B2 | 4/2010 | Scales |
| 7,721,059 B2 | 5/2010 | Mylly et al. |
| 7,725,628 B1 | 5/2010 | Phan et al. |
| 7,752,173 B1* | 7/2010 | Gole ................ G06F 11/2097 707/654 |
| 7,711,140 B2 | 9/2010 | Estakhri et al. |
| 7,793,061 B1* | 9/2010 | Gupta et al. ................ 711/162 |
| 7,831,783 B2 | 11/2010 | Pandit et al. |
| 7,853,772 B2 | 12/2010 | Chang et al. |
| 7,873,803 B2 | 1/2011 | Cheng |
| 7,882,305 B2 | 2/2011 | Moritoki |
| 7,904,647 B2 | 3/2011 | El-Batel et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,975,169 B2 | 7/2011 | Ash |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,082 B2 | 4/2012 | Flynn et al. |
| 8,171,204 B2 | 5/2012 | Chow et al. |
| 8,214,583 B2 | 7/2012 | Sinclair et al. |
| 8,244,935 B2 | 8/2012 | Leventhal et al. |
| 8,479,294 B1 | 7/2013 | Li et al. |
| 8,539,124 B1* | 9/2013 | Burke ............................. 710/74 |
| 8,549,222 B1 | 10/2013 | Kleiman et al. |
| 8,806,115 B1* | 8/2014 | Patel et al. .................... 711/103 |
| 9,058,123 B2 | 6/2015 | Joshi et al. |
| 10,073,656 B2 | 9/2018 | Zhe Yang et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0194451 A1 | 12/2002 | Mukaida et al. |
| 2003/0061296 A1 | 3/2003 | Craddock et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2003/0236945 A1 | 12/2003 | Nahum |
| 2004/0003002 A1 | 1/2004 | Adelmann |
| 2004/0059869 A1* | 3/2004 | Orsley ................ G06F 11/1076 711/114 |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0169885 A1 | 9/2004 | Mellor |
| 2004/0186946 A1 | 9/2004 | Lee |
| 2004/0205177 A1 | 10/2004 | Levy et al. |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0149618 A1 | 7/2005 | Cheng |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0026385 A1 | 2/2006 | Dinechin et al. |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0129778 A1 | 6/2006 | Clark et al. |

(56) References Cited

U.S. PATENT DOCUMENTS

| | | |
|---|---|---|
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Chow et al. |
| 2007/0073971 A1 | 3/2007 | Ezra et al. |
| 2007/0233455 A1 | 3/2007 | Zimmer et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0294676 A1 | 12/2007 | Mellor et al. |
| 2007/0300008 A1 | 12/2007 | Rogers et al. |
| 2008/0005748 A1 | 1/2008 | Matthew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0209090 A1 | 5/2008 | Esmaili et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0155375 A1* | 6/2008 | Vera .................... G06F 11/1008 714/758 |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1 | 10/2008 | Rolia et al. |
| 2008/0276040 A1 | 11/2008 | Moritoki |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0094391 A1* | 4/2009 | Yim ............................... 710/57 |
| 2009/0125650 A1 | 5/2009 | Sebire |
| 2009/0125700 A1 | 5/2009 | Kisel |
| 2009/0132621 A1* | 5/2009 | Jensen .................... G06F 3/061 |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0287887 A1 | 11/2009 | Matsuki et al. |
| 2009/0292861 A1 | 11/2009 | Kanevsky et al. |
| 2009/0294847 A1 | 11/2009 | Maruyama et al. |
| 2009/0300277 A1 | 12/2009 | Jeddoloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi et al. |
| 2010/0011147 A1 | 1/2010 | Hummel |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0076936 A1 | 3/2010 | Rajan |
| 2010/0082922 A1 | 4/2010 | Kuruvilla |
| 2010/0095059 A1 | 4/2010 | Kisley et al. |
| 2010/0125695 A1* | 5/2010 | Wu ....................... G06F 3/0613 711/103 |
| 2010/0169542 A1 | 7/2010 | Sinclair |
| 2010/0205231 A1 | 8/2010 | Cousins |
| 2010/0205335 A1 | 8/2010 | Phan et al. |
| 2010/0211731 A1* | 8/2010 | Mittendorff et al. ......... 711/113 |
| 2010/0211737 A1 | 8/2010 | Flynn et al. |
| 2010/0217916 A1 | 8/2010 | Guo et al. |
| 2010/0235597 A1 | 9/2010 | Arakawa |
| 2010/0250834 A1 | 9/2010 | Trika |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0274962 A1* | 10/2010 | Mosek et al. ................. 711/113 |
| 2010/0306452 A1 | 12/2010 | Frank |
| 2011/0022819 A1 | 1/2011 | Post et al. |
| 2011/0119228 A1* | 5/2011 | Menze .............. G06F 17/30132 707/607 |
| 2011/0179162 A1 | 7/2011 | Mayo et al. |
| 2011/0225342 A1 | 9/2011 | Sharma et al. |
| 2011/0238546 A1 | 9/2011 | Certain et al. |
| 2011/0238737 A1* | 9/2011 | Agrawal et al. ............... 709/203 |
| 2011/0265083 A1* | 10/2011 | Davis ............................... 718/1 |
| 2011/0320733 A1 | 12/2011 | Sanford et al. |
| 2012/0017209 A1 | 1/2012 | Ben-Yehuda et al. |
| 2012/0054421 A1 | 3/2012 | Hiratsuka et al. |
| 2012/0059994 A1* | 3/2012 | Montgomery et al. ....... 711/119 |

(56) References Cited

U.S. PATENT DOCUMENTS

| | | | |
|---|---|---|---|
| 2012/0131278 A1 | 5/2012 | Chang et al. | |
| 2012/0144110 A1 | 6/2012 | Smith | |
| 2012/0191928 A1 | 7/2012 | Nakamura | |
| 2012/0210066 A1 | 8/2012 | Joshi et al. | |
| 2012/0221765 A1 | 8/2012 | Yoo et al. | |
| 2012/0254824 A1 | 10/2012 | Bansod | |
| 2012/0278588 A1 | 11/2012 | Adams et al. | |
| 2012/0311263 A1* | 12/2012 | Kamath | G06F 3/0674 711/118 |
| 2013/0036093 A1 | 2/2013 | Heiser | |
| 2013/0073821 A1* | 3/2013 | Flynn et al. | 711/162 |
| 2013/0111474 A1* | 5/2013 | Agarwal et al. | 718/1 |
| 2013/0198748 A1 | 8/2013 | Sharp | |
| 2013/0227236 A1* | 8/2013 | Flynn et al. | 711/165 |
| 2013/0232303 A1 | 9/2013 | Quan | |
| 2013/0339958 A1 | 12/2013 | Droste et al. | |
| 2014/0052892 A1* | 2/2014 | Klein | G06F 12/0246 711/103 |
| 2014/0068183 A1* | 3/2014 | Joshi et al. | 711/114 |
| 2014/0115228 A1* | 4/2014 | Zhou et al. | 711/102 |
| 2014/0136872 A1 | 5/2014 | Cooper et al. | |
| 2014/0156938 A1 | 6/2014 | Galchev et al. | |
| 2014/0297780 A1* | 10/2014 | Zhou et al. | 709/216 |

FOREIGN PATENT DOCUMENTS

| | | | |
|---|---|---|---|
| EP | 1100001 | 5/2001 | |
| EP | 1418502 | 5/2004 | |
| EP | 1582971 | 10/2005 | |
| EP | 1582971 A2 * | 10/2005 | G06F 3/06 |
| EP | 1814039 | 3/2009 | |
| GB | 123416 | 9/2001 | |
| JP | 4242848 | 8/1992 | |
| JP | 8153014 | 6/1996 | |
| JP | 200259525 | 9/2000 | |
| JP | 2009122850 | 6/2009 | |
| WO | WO1994/019746 | 9/1994 | |
| WO | WO1995/018407 | 7/1995 | |
| WO | WO1996/012225 | 4/1996 | |
| WO | WO2001/031512 | 5/2001 | |
| WO | 2002001365 A2 | 1/2002 | |
| WO | WO2002/001365 | 1/2002 | |
| WO | WO2004/061645 | 7/2004 | |
| WO | WO2004/099989 | 11/2004 | |
| WO | WO2005/103878 | 11/2005 | |
| WO | WO2006/062511 | 6/2006 | |
| WO | WO2006/065626 | 6/2006 | |
| WO | WO2008/130799 | 3/2008 | |
| WO | WO2008/073421 | 6/2008 | |
| WO | WO2011/106394 | 9/2011 | |
| WO | WO2014/036307 | 3/2014 | |
| WO | WO 2014036307 A1 * | 3/2014 | G06F 12/08 |

OTHER PUBLICATIONS

Chris Evans, "Write-through, write-around, write-back: Cache explained," ComputerWeekly.com, http://www.computerweekly.com/feature/Write-through-write-around-write-back-Cache-explained.*

C. Mellor, 2011, "Is EMC developing storage super-stack?" http://www.theregister.co.uk/2011/01/20/emc_vnx_abstraction_musinhs/.*

Gal, "A Transactional Flash File System for Microcontrollers," 2005 USENIX Annual Technical Conference, published Apr. 10, 2009.

Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.

Gill, "WOW: Wise Ordering for Writes—Combining Spatial and Temporal Locality in Non-Volatile Caches," IBM, Fast 05: 4th USENIX Conference on File and Storage Technologies, 2005.

Gutmann, "Secure Deletion of Data from Magnetic and Solid-State Memory", Usenix, 14 pages, San Jose, CA, published Jul. 1, 1996.

Huffman, "Non-Volatile Memory Host Controller Interface," Apr. 14, 2008, 65 pgs.

Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.

Hystor: "Making SSDs the Survival of the Fittest in High-Performance Storage Systems," ics10-Paper 102, Feb. 2010.

IBM, "Method to Improve Reliability of SSD Arrays," Nov. 2009.

Information Technology, "SCSI Object-Based Storage Device Commands," 2 (OSD-2), Project T10/1729-D, Revision 4, published Jul. 30, 2004, printed Jul. 24, 2008.

Intel, "Non-Volatile Memory Host Controller Interface (NVMHCI) 1.0," Apr. 14, 2008.

Johnson, "An Introduction to Block Device Drivers," Jan. 1, 1995.

Kawaguchi, "A Flash-Memory Based File System," TCON'95 Proceedings of the USENIX 1995 Technical Conference Proceedings, p. 13.

Linn, Craig, "Windows I/O Performance: Cache Manager and File System Considerations," CMGA Proceedings, Sep. 6, 2006.

Lu, Pin, "Virtual Machine Memory Access Tracing with Hypervisor Exclusive Cache," Department of Computer Science, University of Rochester, 2007.

Luo, "S-CAVE: Effective SSD Caching to Improve Virtual Machine Storage Performance," Proceedings of the 22nd International Conference on Parallel Architectures and Compilation Techniques, IEEE 2013, pp. 103-112.

Mesnier, "Object-Based Storage," IEEE Communications Magazine, Aug. 2003, pp. 84-90.

Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.

Micron, TN-29-08: Technical Note, "Hamming Codes for NAND Flash Memory Devices," Mar. 10, 2010.

Micron, "TN-29-17: NAND Flash Design and Use Considerations," Mar. 10, 2010.

Micron, "TN-29-42: Wear-Leveling Techniques in NAND Flash Devices," Mar. 10, 2010.

Microsoft, "Data Set Management Commands Proposal for ATA8-ACS2," published Oct. 5, 2007, Rev. 3.

Microsoft, "How NTFS Works," Apr. 9, 2010.

Morgenstern, David, "Is There a Flash Memory RAID in your Future?", http://www.eweek.com—eWeek, Ziff Davis Enterprise Holdings Inc., Nov. 8, 2006, visited Mar. 18, 2010.

Novell, "File System Primer", http://wiki.novell.com/index.php/File_System_Primer, 2006, visited Oct. 18, 2006.

Perfectcacheserver, "Automatic Disk Caching," http://www.Raxco.Com/business/perfectcache_server.aspx, last visited Oct. 31, 2012.

Pivot3, "RAIGE Cluster: Technology Overview," White Paper, www.pivot3.com, Jun. 2007.

Plank, "A Tutorial on Reed-Solomon Coding for Fault Tolerance in RAID-like System," Department of Computer Science, University of Tennessee, pp. 995-1012, Sep. 1997.

Porter, "Operating System Transactions," ACM 978-1-60558-752-3/09/10, published Oct. 1, 2009.

Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.

Ranaweera, 05-270RO, SAT: Write Same (10) command (41h), T10/05, Jul. 7, 2005, www.t10.org/ftp/t10/document.05/05-270r0.pdf, last visited Apr. 11, 2013.

Rosen, Richard, "IntelliCache, Scalability and Consumer SSDs," blogs.citrix.com/2012/01/03/intellicache-scalability-and-consumer-ssds, Jan. 3, 2012, accessed Aug. 3, 2012.

Rosenblum, "The Design and Implementation of a Log-Structured File System," ACM Transactions on Computer Systems, vol. 10 Issue 1, Feb. 1992.

(56) References Cited

OTHER PUBLICATIONS

Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536," Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, "Implementing MLC NAND Flash for Cost-Effective, High Capacity Memory," M-Systems, White Paper, 91-SR014-02-8L, Rev. 1.1, Sep. 2003.
Solidata, "Best Practices Guide, Sybase: Maximizing Performance Through Solid State File-Caching," http://solidata.com/resources/pdf/bp-sybase.pdf. May 2000, cited May 18, 2011.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
International Preliminary Report on Patentability dated Mar. 3, 2015 for international application PCT/US2013/057366.
Joshi, et al., Final Office Action dated Nov. 30, 2016 for U.S. Appl. No. 13/829,358.
Joshi, et al., Final Office Action dated Nov. 7, 2014 for U.S. Appl. No. 14/262,581.
Joshi, et al., Final Office Action dated Sep. 25, 2015 for U.S. Appl. No. 13/829,358.
Joshi, et al., Non-Final Office Action dated Feb. 6, 2015 for U.S. Appl. No. 13/829,358.
Joshi, et al., Non-Final Office Action dated Jun. 14, 2016 for U.S. Appl. No. 13/829,358.
Joshi, et al., Non-Final Office Action dated Jun. 19, 2014 for U.S. Appl. No. 14/262,581.
Joshi, et al., Notice of Allowance dated Feb. 17, 2015 for U.S. Appl. No. 14/262,581.
Yang, et al., Final Office Action dated Apr. 7, 2016 for U.S. Appl. No. 14/245,893.
Yang, et al., Non-Final Office Action dated Jan. 11, 2017 for U.S. Appl. No. 14/245,893.
Yang, et al., Non-Final Office Action dated Sep. 10, 2015 for U.S. Appl. No. 14/245,893.
Joshi, et al., Office Action dated Oct. 5, 2017 for U.S. Appl. No. 13/829,358.
Yang, et al., Office Action dated Jul. 26, 2017 for U.S. Appl. No. 14/245,893.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, "Bulletproof Memory for RAID Servers, Part 1," http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Nameless Writes," HotStorage '10, Boston, MA, Jun. 2010.
Asine, "ASPMC-660 Rugged IDE Flash Drive PMC Module", http://www.asinegroup.com/products/aspmc660.html, copyright 2002, visited Nov. 8, 2009.
Bandulet "Object-Based Storage Devices," Jul. 2007 http://developers.sun.com/solaris/articles/osd.htme, visited Dec. 1, 2011.
Barrall et al., U.S Appl. No. 60/625,495, "Dynamically Expandable and Contractible Fault-Tolerant Storage System Permitting Variously Sized Storage Devices and Method," filed Nov. 5, 2004.
Barrall et al., U.S Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Bonnet et al., "Flash Device Support for Database Management," published at the 5th Biennial Conference on Innovative Data Systems Research (CIDR '11), held in Asilomar, California, on Jan. 9-12, 2011.
Brandon, Jr., "Sparse Matrices in CS Education," Journal of Computing Sciences in Colleges, vol. 24 Issue 5, May 2009, pp. 93-98.
Casey, "San Cache: SSD in the San," Storage Inc., http://www.solidata.com/resources/pdf/storaging.pdf, 2000, visited May 20, 2011.
Casey, "Solid State File-Caching for Performance and Scalability," SolidData Quarter 1 2000, http://www/storagesearch.com/3dram.html, visited May 20, 2011.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.//datadirectnet.com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Friedman, Mark et al., "File Cache Performance and Tuning, Windows 2000 Performance Guide, O'Reilly & Associates, Inc., http://msdn.microsoft.com/en-us/library/ms369863.aspx," published Jan. 2002, visited Aug. 3, 2012.
State Intellectual Property Office, Office Action, CN Application No. 200780050970.0, dated Jun. 29, 2011.
State Intellectual Property Office, Office Action, CN Application No. 200780050983.8, dated May 18, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Oct. 28, 2010.
Steere, David et al., "Efficient User-Level File Cache Management on the Sun Vnode Interface," School of Computer Science, Carnegie Mellon University, Apr. 18, 1990.
Superspeed, "New Super Cache 5 on Servers," http://www.superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
USPTO, Interview Summary, U.S. Appl. No. 10/372,734, dated Feb. 28, 2006.

(56) References Cited

OTHER PUBLICATIONS

USPTO, Office Action for U.S. Appl. No. 10/372,734, dated Sep. 1, 2005.
USPTO, Final Office Action, U.S. Appl. No. 11/952,109, dated Nov. 29, 2011.
USPTO, Office Action, U.S. Appl. No. 11/952,113, dated Dec. 15, 2010.
USPTO, Notice of Allowance, U.S. Appl. No. 11/952,109, dated May 1, 2013.
USPTO, Office Action for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13,607,486 dated May 2, 2013.
USPTO, Office Action for U.S. Appl. No. 13/118,237 dated Apr. 22, 2013.
Van Hensbergen, "Dynamic Policy Disk Caching for Storage Networking," IBM Research Division, RC24123 (W0611-189), Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices," 21st IEEE/12th SA Goddard Conference on Mass Storage Systems and Technologies, Apr. 2004.
Wikipedia, "Object Storage Device," http://en.wikipedia.org/wiki/Object-storage-device, last visited Apr. 29, 2010.
Winnett, "S2A9550 Overview," White Paper, http://www.ddn.com/pdfs/ddn_s2a_9550_white_paper.pdf, Jul. 2006.
WIPO, International Preliminary Report of Patentability for PCT/US2007/086691, dated Feb. 16, 2009.
WIPO, International Preliminary Report on Patentability for PCT/US2007/025048, dated Jun. 10, 2009.
WIPO, International Preliminary Report on Patentability for PCT/US2007/086687, dated Mar. 18, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2010/048325, dated Mar. 13, 2012.
WIPO, International Search Report and Written Opinion for PCT/US11/65927, dated Aug. 28, 2012.
WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Search Report and Written Opinion for PCT/US2007/086687, dated Sep. 5, 2008.
WIPO, International Search Report and Written Opinion for PCT/US2007/086691, dated May 8, 2008.
WIPO, International Search Report and Written Opinion for PCT/US2007/086701, dated Jun. 5, 2008.
WIPO, International Search Report and Written Opinion for PCT/US2007/025049, dated May 14, 2008.
WIPO, International Search Report and Written Opinion for PCT/US2012/029722, dated Oct. 30, 2012.
WIPO, International Search Report for PCT/US2012/50194, dated Feb. 26, 2013.
Woodhouse, "JFFS: The Journaling Flash File System," Ottawa Linux Symposium, http://wources.redhat.com/jffs2/jffs2.pdf, Jul. 2001.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
CN Patent Application No. 201380053149.X Third Office Action dated Jul. 4, 2018.
U.S. Appl. No. 13/829,358 Notice of Allowance dated Mar. 6, 2019.

* cited by examiner

SYSTEMS, METHODS, AND INTERFACES FOR ADAPTIVE PERSISTENCE

CROSS-REFERENCE TO RELATED APPLICATIONS

This application claims priority to U.S. Provisional Patent Application Ser. No. 61/696,126, entitled, "Systems, Methods and Interfaces for Adaptive Persistence," filed Aug. 31, 2012, for Vikram Joshi et al., which is hereby incorporated by reference.

TECHNICAL FIELD

The disclosure relates to systems and methods for adaptive persistence and, in several embodiments, to systems and methods for managing data cached in an ephemeral cache mode.

BACKGROUND

Input/output (I/O) requests may have different data persistence needs. For example, some write requests may pertain to data that needs to be secured against data loss or corruption. Other write requests may pertain to data that does not need to be preserved for long periods of time and/or is expected to be lost on restart and/or reboot. A storage system may treat all requests alike, which may reduce I/O performance.

SUMMARY

Disclosed herein are embodiments of a method for adaptive persistence. The disclosed methods may comprise one or more machine-executable operations and/or steps. The disclosed operations and/or steps may be embodied as program code stored on a computer readable storage medium. Accordingly, embodiments of the methods disclosed herein may be embodied as a computer program product comprising a computer readable storage medium storing computer usable program code executable to perform one or more method operations and/or steps.

In some embodiments, the disclosed method comprises identifying a plurality of I/O requests, selecting respective levels of persistence for the I/O requests based on one or more properties of the I/O requests, and servicing the I/O requests using one or more storage resources in accordance with the level of persistence selected for the I/O requests. Identifying the I/O request may comprise monitoring I/O requests in a storage stack.

The level of persistence may correspond to one or more storage resources for use in servicing I/O requests having the respective level of persistence, a configuration of one or more storage resources used to service I/O requests, or the like. One or more of the levels of persistence may be configured to specify a storage mode. A persistence level may specify redundant storage on two or more storage resources, and the method may further include servicing I/O requests having the one persistence level using the two or more storage resources.

In some embodiments, the method comprises selecting a first persistence level for a first I/O request based on one or more of a file identifier associated with the first I/O request and an application associated with the first I/O request. One of the persistence levels may correspond to an ephemeral caching mode, and the method may further comprise storing data of I/O requests having the one persistence level in a cache without storing the data on a primary storage resource.

Disclosed herein are embodiments of a method, comprising receiving an input/output (I/O) request originating from a storage client, determining one of a plurality of persistence levels for the I/O request based on one or more characteristics of the I/O request, wherein each of the persistence levels specifies one or more of a storage resource to use to service the I/O request, a configuration of the storage resource, and a storage mode, and/or servicing the I/O request according to the selected persistence level. A first one of the persistence levels may specify an ephemeral caching mode, and a second one of the persistence levels specifies a write-through caching mode. Two or more of the persistence levels differ with respect to storage resources used to service I/O request, storage configuration and/or caching mode.

A first one of the persistence levels may specify an ephemeral cache mode, and the method may further comprise acknowledging completion of write I/O requests of the first persistence level in response to writing data of the write I/O requests to a cache resource and without writing data of the write I/O requests to primary storage. In some embodiments, a first one of the persistence levels specifies a first error-correction code encoding, and a second one of the persistence levels specifies a second, different error-correction code encoding.

The method may further include determining a persistence level for an I/O request based on one or more of a source identifier of the I/O request, a file identifier of the I/O request, an application associated with the I/O request, and a parameter of the I/O request.

Disclosed herein are embodiments of an apparatus, comprising a persistence level module configured to chose one of a plurality of adaptive persistence levels for each of a plurality of storage requests based on characteristics of the storage requests, wherein the adaptive persistence level chosen for a storage request determines one or more of a storage resource, a configuration of the storage resource, and a storage mode for servicing the storage request, an interface module configured to interface with one or more storage resources, and a storage request execution module configured to service the storage requests according to the adaptive persistence levels assigned to the storage requests by use of the interface module. The persistence level module may be configured to choose an adaptive persistence level for a storage request based on one or more of a file identifier of the storage request, an application associated with the storage request, a parameter of the storage request, and an input/output (IO) control parameter. The storage request execution module may be configured to cache data of a storage request having an ephemeral adaptive persistence level in a write-never cache mode. A first one of the adaptive persistence levels may comprise storing data in a first RAID configuration, and a second one of the adaptive persistence levels comprises storing data in a second, different RAID configuration.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments, and/or changes may

DETAILED DESCRIPTION

Figure 1A:
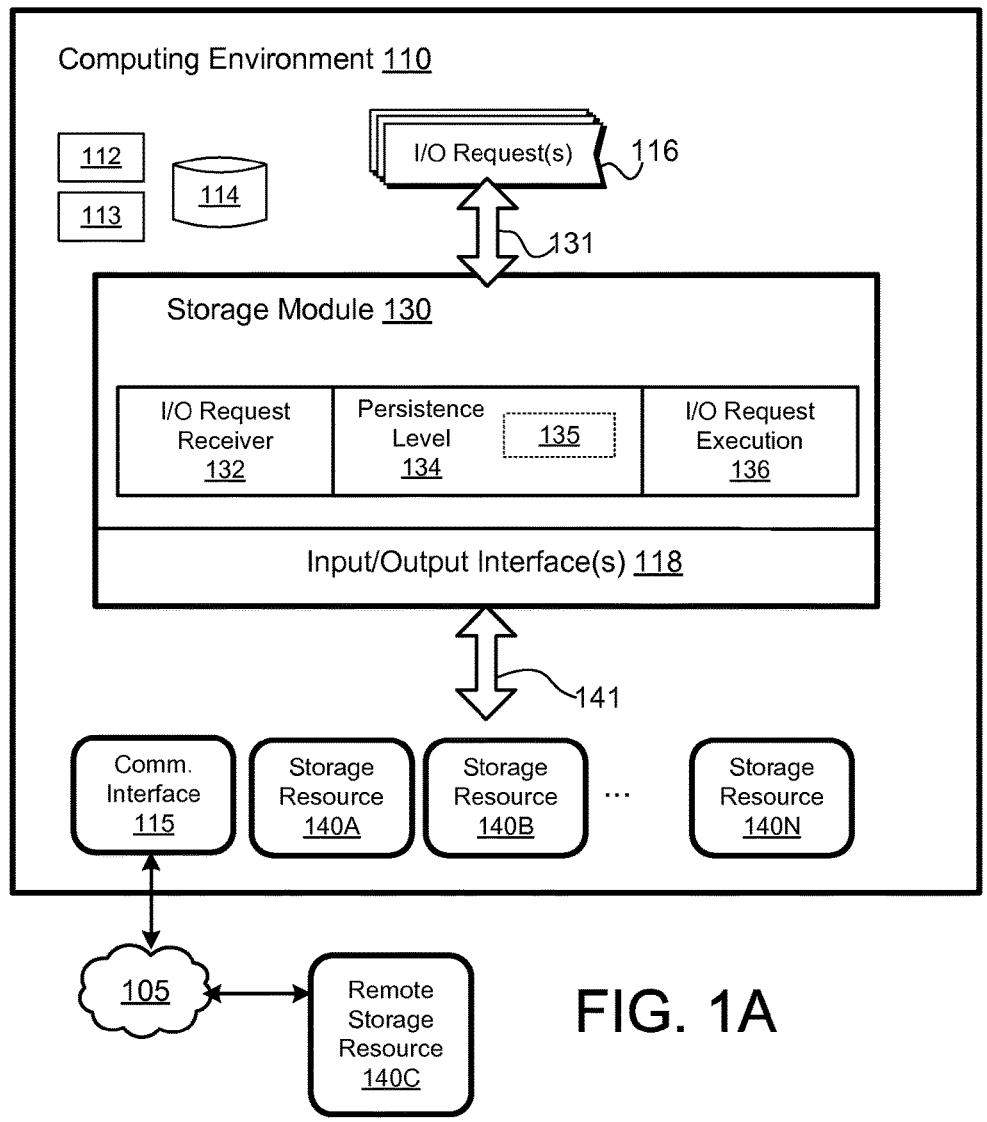
FIG. 1A is a block diagram of one embodiment of a system for adaptive persistence.

The embodiments described herein relate to the management of data input/output (I/O) requests and operations in various computing environments, including, but not limited to, virtualized computing environments, bare metal computing environments, and the like. Therefore, although particular examples and/or embodiments disclosed herein relate to virtualized computing environments, the disclosure is not limited in this regard.

A storage module may be configured to manage I/O operations for one or more storage clients, which may include, but are not limited to, operating systems, virtual operating systems, hypervisors, file systems, volume managers, database applications, user applications, or the like. The storage module may be configured to service I/O requests for the storage clients. The storage module may be configured to service I/O requests according to a selected "level of persistence." As used herein, a "level of persistence" or "persistence level" refers to one or more characteristics and/or properties of an I/O request. The level of persistence of an operation may pertain to: the storage device(s) and/or storage media to use to service the I/O request (e.g., volatile memory or non-volatile storage media), the configuration of the selected storage device(s) and/or media (e.g., redundant array of inexpensive disks (RAID) level, just a bunch of disks (JBOD) configuration, mirroring, or the like), the storage mode and/or format for the I/O request (e.g., write-through cache mode, ephemeral cache mode, ECC encoding, or the like), and so on. Different levels of persistence may, therefore, comprise storing data on different types of storage device(s) and/or storage media, such as volatile memory, non-volatile storage media (e.g., magnetic, optical, tape, solid-state, or the like), or the like; storing data in different storage configurations, such as different RAID levels, mirroring configurations, parity configurations, and so on; and/or storing data in one or more different modes, such as different ECC encodings, encryption levels, caching modes, atomicity, verification, and so on.

The storage module may be configured to select a level of persistence for I/O requests according to properties of the I/O requests, which may include, but are not limited to, an explicit request for a particular level of persistence included and/or associated with the I/O request, a request for particular storage characteristics, characteristics and/or properties of the I/O request, policy, profiling, testing and experience, and the like. For example, in response to an I/O request pertaining to data that needs to be available for a long period of time, the storage module may select a level of persistence that comprises storing the data on a non-volatile storage medium in a RAID and/or mirrored configuration. The selected level of persistence may further comprise caching data of the I/O request in a write-through cache configuration, such that updates to the data are written through to the primary storage. In another example, in response to an I/O request pertaining to data that only needs to be retained for a limited time, the storage module may select a level of persistence that comprises caching data of the I/O request in an "ephemeral" or "write-never" cache mode. As used herein, an ephemeral cache mode refers to a cache configuration in which cached data is not written through and/or written back to a primary storage; ephemeral data may be stored only in the cache. As such, caching data in an ephemeral cache configuration comprises storing data in the cache, without accessing primary storage (and/or without writing and/or copying the data to the primary store). Data cached in an ephemeral cache configuration may be lost if or when the data is evicted from the cache (e.g., the cache client power cycles, reboots, or the like) unless the data is transitioned to another level of persistence, which may comprise caching the data in a different cache mode, such as a write-through and/or write-back cache mode.

FIG. 1A is a block diagram of one embodiment of a system for adaptive persistence. A module 130 may be implemented within a computing environment 110, which may comprise a base-metal computing environment or computing device, which may include, but is not limited to, one or more computing devices, a plurality of computing devices (e.g., a group of computing devices in a cluster, grid, or other configuration), a personal computer, server computer, blade, laptop, notebook, smart phone, or the like. The computing environment 110 may be a virtualized computing environment comprising one or more virtual machines, virtual desktops (e.g., in a virtual desktop infrastructure (VDI) environment), a virtual computer, or the like.

The computing environment 110 may comprise processing resources 112, volatile memory resources 113, persistent storage resources 114, and/or a communication interface 115. The processing resources 112 may comprise one or more general and/or special purpose processing elements and/or cores. The processing resources 112 may be configured to execute instructions loaded from the persistent storage resources 114. Portions of the modules and/or methods disclosed herein may be embodied as machine-readable instructions stored on the persistent storage resources 114. The resources 112, 113, 114, and/or 115 may comprise physical computing components and/or virtualized computing resources provided by and/or through a virtualization environment (e.g., a hypervisor).

The storage module 130 may include an I/O request receiver module 132, persistence level module 134, and I/O request execution module 136. Portions of the storage module 130 may operate on, or in conjunction with, the computing environment 110. Alternatively, or in addition, portions of the storage module 130 may be implemented separately from the computing environment 110; for example, portions of the storage module 130 may be connected using a system bus, such as a peripheral component interconnect express (PCI-e) bus, a Serial Advanced Technology Attachment (serial ATA) bus, universal serial bus (USB) connection, an Institute of Electrical and Electronics Engineers (IEEE) 1394 bus (FireWire), an external PCI bus, Infiniband, communication network 105, or the like.

The storage module 130 may be communicatively coupled to one or more storage resources 140A-N. The storage resources 140A-N may comprise local storage resources accessible via respective interface mechanisms 141, which may include, but are not limited to, bus interfaces and/or protocols (e.g., a system bus, a local bus, an I/O bus, or the like). The storage resources 140A-N may further comprise one or more remote, network-accessible storage resources 140C, which may include, but are not limited to, a Storage Area Network (SAN) resource, network attached storage (NAS), or the like, which may be accessible via a remote I/O interface and/or protocol 141.

The storage resources 140A-N may include different types of storage device(s) and/or storage media in various configurations. The storage resources 140A-N may include, but are not limited to, volatile storage resources, such as volatile memory (DRAM), processor cache, and the like; non-volatile storage resources, such as magnetic hard drives, optical storage media, solid-state storage media, and the like; cache resources; and so on. Accordingly, the storage resources 140A-N may include, but are not limited to, flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), Resistive Random-Access Memory (RRAM), Programmable Metallization Cell (PMC), Conductive-Bridging RAM (CBRAM), Magneto-Resistive RAM (MRAM), Dynamic RAM (DRAM), Phase change RAM (PRAM), magnetic media (e.g., one or more hard disks), optical media, or the like.

The storage resources 140A-N may be configured in various storage configurations and/or modes, such as one or more different RAID levels; mirroring configurations; caching configurations and/or modes; ECC encodings; parity configurations; and the like. For example, one or more of the storage resources 140A-N may comprise a set of non-volatile storage elements (e.g., hard disks) in a RAID and/or mirroring configuration, whereas other storage resources 140A-N may be non-redundant. The storage resources 140A-N may be configured to store data according to different retention policies (e.g., caching modes). For example, the storage resource 140A may be configured to cache data for another, primary storage resource 140B. The storage module 130 may configure the cache resources to operate in particular caching modes and/or configurations. For example, the storage module 130 may cache data of a first I/O request in a write-through configuration (e.g., write the data to the cache storage resource 140A and the primary storage resource 140B), and may cache data of a second I/O request in an ephemeral cache mode, in which the data is stored only in the cache storage resource 140A and is lost on eviction (e.g., reboot).

The storage module 130 may be configured to service I/O requests 116 from one or more storage clients. The I/O request(s) 116 may be received at the I/O request receiver module 132 via one or more interface(s) 131 of the storage module 130, which may include, but are not limited to, one or more drivers, libraries, modules, block device interfaces, interface extensions (e.g., input/output control (IOCTL) interfaces), Application Programming Interfaces (API), application binary interfaces (ABI), object classes, remote interfaces (e.g., Remote Procedure Call, Simple Object Access Protocol, or the like), and the like.

The storage module 130 may further comprise a persistence level module 134 configured to select a persistence level for the I/O request 116. As disclosed above, determining the persistence level may include, but is not limited to, selecting one or more storage resource(s) 140A-N to service the I/O request 116, selecting a storage configuration of the one or more selected storage resource(s) 140A-N (e.g., RAID level, mirroring, or the like), and/or selecting a storage mode for the I/O request 116 (e.g., caching mode, ECC encoding, or the like).

The persistence level module 134 may determine the persistence level for I/O requests 116 based on a persistence level policy 135. The persistence level policy 135 may comprise persistence level criteria configured to assign persistence levels to respective I/O requests 116 based on characteristics and/or properties of the I/O requests 116, that may include, but are not limited to, file properties and/or characteristics (e.g., file-level knowledge), such as the file name, path, volume, and/or other file identifier corresponding to the I/O request 116; properties and/or characteristics of the application and/or storage client of the I/O request 116 (e.g., application-level knowledge); inferences drawn from the I/O requests 116; one or more parameters of the I/O request 116; parameters associated with the I/O request 116 (e.g., IOCTL information); profiling metadata pertaining to the I/O requests 116; preferences and/or configuration; testing and experience; and so on. For example, in some embodiments, one or more of the interfaces 131A and/or 131B may comprise mechanisms for specifying persistence level characteristics for I/O requests 116. For example, the I/O request 116 may request storage in a redundant storage configuration (e.g., a particular RAID level and/or mirroring configuration). The I/O request 116 may further specify a caching mode for the I/O request 116 (e.g., specify a write-through cache mode). I/O requests 116 pertaining to temporary data may specify a different persistence level (or different persistence level characteristics). For instance, an I/O request 116 pertaining to temporary data may indicate that redundancy and/or mirroring is not required and may allow caching in an ephemeral cache configuration (disclosed in further detail herein). Alternatively, or in addition, the persistence level module 134 may determine a persistence level based on persistence level criteria pertaining to other, non-explicit information pertaining to the I/O request 116. For example, persistence level criteria may identify temporary files that do not need to be retained between reboots (e.g., by use of file selection criteria, as described herein). The persistence level module 134 assigns I/O requests 116 pertaining to such temporary files to an appropriate persistence level (e.g., caching data of the I/O requests 116 in a an ephemeral cache).

The storage module 130 may further comprise an I/O request execution module 136 configured to service I/O requests 116. The I/O request execution module 136 may be configured to store data of I/O requests 116 on one or more storage resources 140A-N in one or more storage configurations and/or modes in accordance with the respective persistence levels of the I/O requests 116, as determined by the persistence level module 134. Accordingly, the I/O request execution module 136 may be configured to store data on one or more different storage resources 140A-N, according to one or more different storage configurations, and/or in one or more different storage modes (e.g., write-through cache, write-back cache, ephemeral cache, or the like).

Figure 1B:
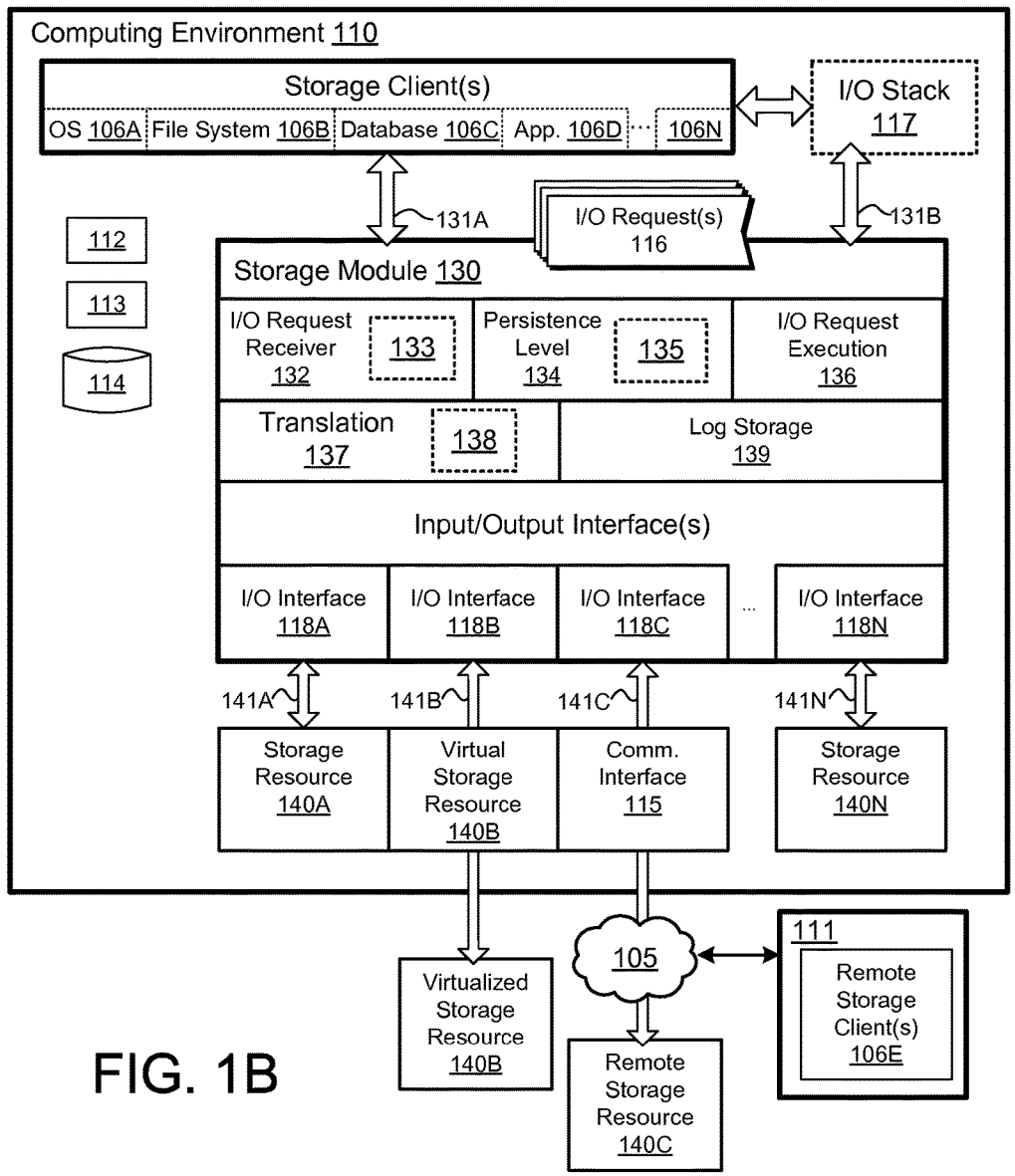
FIG. 1B is a block diagram of another embodiment of a system for adaptive persistence.

FIG. 1B depicts another embodiment of a system for adaptive persistence. The FIG. 1B embodiment depicts the storage module 130 operating within the computing environment 110. As disclosed above, the storage module 130 may be configured to receive I/O requests 116 via the I/O request receiver module 132. The I/O requests 116 may be issued by storage clients 106A-N, which include, but are not limited to, operating systems 106A, file systems 106B, databases 106C, user applications 106D, and so on. The storage clients 106A-N may operate within the computing environment 110 and/or may comprise and/or operate within other, remote computing environments 111 (e.g., remote storage client(s) 106E).

In some embodiments, one or more of the storage clients 106A-N are configured to issue I/O requests 116 directly to the storage module 130 via one or more interfaces 131A. Alternatively, or in addition, the storage module 130 may be configured to receive and/or monitor I/O requests 116 within an I/O stack 117 of the computing environment 110. The I/O stack 117 may comprise a storage stack or other I/O subsystem of an operating system 106A (or virtual operating system 106A). Accordingly, in some embodiments, the I/O request receiver module 132 may comprise one or more agent(s) 133 configured to monitor I/O requests 116 in the I/O stack 117. The agent(s) 133 include, but are not limited to, I/O drivers, I/O filter drivers, file filter drivers, volume filter drivers, disk filter drivers, SCSI drivers and/or filters, virtual logical number (VLUN) drivers, or the like.

The storage module 130 may further comprise one or more I/O interfaces 118A-N configured to interface with one or more respective storage resources 140A-N and/or perform storage operations thereon. Each of the I/O interfaces 118A-N may be configured to interface with one or more storage resources 140A-N by use of a particular interface mechanism 141A-N, which may include, but is not limited to, storage resource interfaces (e.g., block device interfaces, storage layers, APIs, protocols, or the like), bus protocols, communication interface protocols, network protocols and/or interfaces, virtualization protocols and/or interfaces, or the like. For example, an I/O interface 118B may be configured to interface with a virtualized storage resource 140B via a virtual I/O interface 141B, and an I/O interface 118C may be configured to access a remote storage resource 140C via a network 105 (and/or communication interface 115).

One or more of the storage resources 140A-N may comprise a non-volatile storage medium, such as a solid-state storage media. For example, the I/O interface 118A may be communicatively coupled to a solid-state storage resource 140A. Therefore, in some embodiments, the I/O interface 118A may comprise and/or be communicatively coupled to one or more solid-state storage controllers as described in U.S. patent application Ser. No. 11/952,091, filed Dec. 6, 2007, entitled "Apparatus, System, and Method for Managing Data Using a Data Pipeline," and published as United States Patent Application Publication No. 2008/0141043 on Jun. 12, 2008, which is hereby incorporated by reference.

The storage module 130 may comprise a translation module 137 configured to maintain mappings and/or associations between logical identifiers and storage resources. As used herein, a logical identifier refers to any identifier for referencing an I/O resource (e.g., data stored on the non-volatile storage resources 140), including, but not limited to, a logical block address (LBA), a cylinder/head/sector (CHS) address, a file name, an object identifier, an inode, a Universally Unique Identifier (UUID), a Globally Unique Identifier (GUID), a hash code, a signature, an index entry, a range, an extent, or the like. The mappings may be "any-to-any," such that any logical identifier can be associated with any physical storage location (and vice versa).

The translation module 137 may be configured to maintain I/O metadata 138 pertaining to data of the I/O requests 116 and/or the storage resources 140A-N. The I/O metadata 138 may include, but is not limited to, a forward index (e.g., an index of mappings and/or associations between logical identifiers and storage resources 140A-N), cache tags, validity metadata, atomicity and/or transactional metadata, persistence level metadata, and so on. For example, persistence level metadata may indicate the persistence level of a particular logical identifier, which may be used to service I/O requests 116 pertaining to the logical identifier. The persistence level metadata of an I/O request 116 may identify the storage resource(s) 140A-N that comprise data pertaining to the I/O request 116, the storage configuration of the storage resources 140A-N, information pertaining to the storage mode of the data, and so on. The I/O metadata 138 may comprise one or more data structures, which may include, but are not limited to, a tree, a B-tree, a range-encoded B-tree, a radix tree, a map, a list, a content addressable map (CAM), a table, a hash table, a memory layout (e.g., contiguous memory layout or other suitable layout), a combination of data structures, or the like. The I/O metadata 138 may be maintained within the volatile memory resource 113. Portions of the I/O metadata 138 may be persisted to one or more non-volatile and/or non-transitory storage resources, such as the persistent storage resource 114 and/or one or more of the storage resources 140A-N.

In some embodiments, the storage module 130 may leverage the arbitrary, any-to-any mappings of the translation module 137 to store data in a log format, such that data is updated and/or modified "out-of-place" on one or more of the storage resources 140A-N. As used herein, writing data "out-of-place" refers to modifying and/or overwriting data to different media storage location(s) rather than overwriting the data "in-place" (e.g., overwriting the original physical location of the data). Storing data in a log format may result in obsolete and/or invalid data remaining on the non-volatile storage resources 140. For example, overwriting data of logical identifier "A" out-of-place may result in writing data to new physical storage location(s) and updating the I/O metadata 138 to associate A with the new physical storage locations(s) (e.g., in a forward index). The original physical storage location(s) associated with A are not overwritten and comprise invalid, out-of-date data. Similarly, when data of a logical identifier "X" is deleted or trimmed, the physical storage locations(s) assigned to X may not be immediately erased, but may remain on the non-volatile storage resources 140 as invalid data.

The storage module 130 may further comprise a log storage module 139 configured to store data on one or more of the storage resources 140A-N in a log format (e.g., an "event log"). As used herein, a log format refers to a data storage format that defines and/or preserves an ordered sequence of storage operations performed on the storage resources 140A-N. Accordingly, a log format may define an "event log" of storage operations performed on the storage resources 140A-N. In some embodiments, the log storage module 139 is configured to store data sequentially, from an append point. The log storage module 139 may be further configured to associate data (and/or physical storage locations on the non-volatile storage resources 140) with respective sequence indicators. The sequence indicators may be applied to individual data segments, packets, and/or physical storage locations on the storage resources 140A-N and/or may be applied to groups of data and/or physical storage locations (e.g., erase blocks). In some embodiments, sequence indicators may be applied to physical storage locations when the storage locations are reclaimed (e.g., erased) in a grooming operation and/or when the storage locations are first used to store data.

In some embodiments, the log storage module 139 may be configured to store data according to an "append only" paradigm. The storage module 130 may maintain a current append point within a physical address space of one or more of the storage resources 140A-N. As used herein, an "append point" refers to a pointer or reference to a particular physical storage location (e.g., sector, page, storage division, offset, or the like). The log storage module 139 may be configured to append data sequentially from the append point. As data is stored at the append point, the append point moves to a next available physical storage location of the storage resource 140A-N. The log order of data stored on the storage resource 140A-N may, therefore, be determined based upon the sequence indicator associated with the data and/or the sequential order of the data on the storage resource 140A-N. The log storage module 139 may be configured to identify the "next" available storage location by traversing the physical address space of the storage resource 140A-N (e.g., in a reverse index, as described below) to identify a next available physical storage location.

The storage module 130 may comprise a groomer configured to "groom" a non-volatile storage resource (non-volatile storage media), which may comprise reclaiming physical storage location(s) comprising invalid, obsolete, or "trimmed," data, as described above. As used herein, "grooming" a non-volatile storage resource (e.g., a solid-state storage medium) refers to operations that may include, but are not limited to, wear leveling, removing invalid and/or obsolete data, removing deleted (e.g., trimmed) data, refreshing and/or relocating valid data, reclaiming physical storage resources (e.g., erase blocks), identifying physical storage resources for reclamation, and so on. The groomer may operate autonomously, and in the background, from servicing other I/O requests 116. Accordingly, grooming operations may be deferred while other I/O requests 116 are processed. Alternatively, grooming may operate in the foreground with other I/O requests 116. Reclaiming a physical storage location may comprise erasing invalid data from the physical storage location so that the physical storage location can be reused to store valid data. For example, reclaiming a storage division (e.g., an erase block or logical erase block) may comprise relocating valid data from the storage division, erasing the storage division, and initializing the storage division for storage operations (e.g., marking the storage division with a sequence indicator). The groomer may wear-level the non-volatile storage medium, such that data is systematically spread throughout different physical storage locations, which may improve performance and data reliability, and avoid overuse and/or underuse of particular physical storage locations. Embodiments of systems and methods for grooming non-volatile storage media are disclosed in U.S. Pat. No. 8,074,011, issued Dec. 6, 2011, and entitled, "Apparatus, System, and Method for Storage Space Recovery After Reaching a Read Count Limit," which is hereby incorporated by reference.

In some embodiments, the storage module 130 may be configured to manage asymmetric, "write once" non-volatile storage resources 140, such as solid-state storage media. As used herein, "write once" refers to a storage medium that is reinitialized (e.g., erased) each time new data is written or programmed thereon. As used herein, "asymmetric" refers to storage media having different latencies and/or execution times for different types of storage operations. For example, read operations on asymmetric solid-state non-volatile storage resources 140 may be much faster than write/program operations, and write/program operations may be much faster than erase operations. The solid-state non-volatile storage resources 140 may be partitioned into storage divisions that can be erased as a group (e.g., erase blocks) in order to, inter alia, account for these asymmetric properties. As such, modifying a single data segment "in-place" may require erasing an entire erase block and rewriting the modified data on the erase block, along with the original, unchanged data (if any). This may result in inefficient "write amplification," which may cause excessive wear. Writing data out-of-place as described above may avoid these issues, since the storage module 130 can defer erasure of the obsolete data (e.g., the physical storage location(s) comprising the obsolete data may be reclaimed in background grooming operations).

Further embodiments of systems, methods, and interfaces for managing I/O metadata 138, including mappings and/or associations between logical identifiers and storage resources and/or log storage, are disclosed in U.S. patent application Ser. No. 12/986,117, filed on Jan. 6, 2011, entitled "Apparatus, System, and Method for a Virtual Storage Layer," and published as United States Patent Application Publication No. 20120011340 on Jan. 12, 2012, and U.S. patent application Ser. No. 13/424,333, filed on Mar. 19, 2012, and entitled, "Logical Interface for Contextual Storage," each of which is hereby incorporated by reference.

Figure 1C:
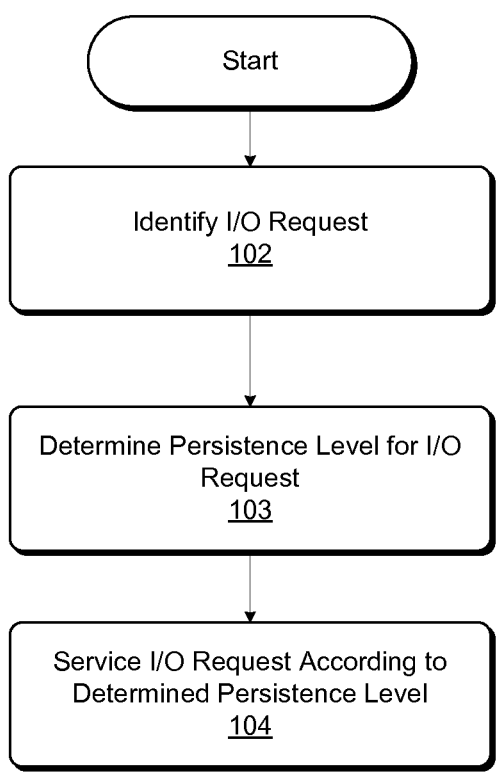
FIG. 1C is a flow diagram of one embodiment of a method for servicing I/O requests.

FIG. 1C is a flow diagram of one embodiment of a method 101 for servicing I/O requests according to different levels of persistence. The method 101, and other methods and/or processes disclosed herein, may be embodied, at least in part, as one or more machine-readable instructions stored on a non-transitory storage, such as the persistent storage resource 114. The instructions may be configured to cause one or more modules within a computing environment 110 to perform one or more steps of the method and/or process. One or more of the instructions may be configured for execution by one or more processing resources 112. Moreover, particular steps of the methods and/or processes disclosed herein may be tied to particular machine components, such as communication interfaces 115, storage resources 140A-N, processing resources 112, or the like.

Step 102 may comprise identifying and/or accessing an I/O request 116. Step 102 may comprise receiving the I/O request 116 from a storage client 106A-N (e.g., via an interface 131A), monitoring and/or intercepting an I/O request 116 (e.g., within an I/O stack 117), and/or the like.

Step 103 may comprise determining a persistence level for the I/O request 116. Step 103 may comprise the persistence level module 134 determining a persistence level for the I/O request 116 based on a persistence level policy 135, which may include, but is not limited to, persistence level criteria, properties of the I/O request 116, inferences drawn from the I/O request 116, profiling metadata, and so on.

Step 104 may comprise servicing the I/O request 116 according to the persistence level selected and/or assigned to the I/O request 116 at step 103. Servicing the I/O request 116 may comprise an I/O request execution module 136 performing one or more storage operations on the storage resources 140A-N (by use of the I/O interface(s) 118A-N). The persistence level of the I/O request 116 may determine the storage resource(s) 140A-N that are to be used to service the I/O request 116, the configuration of the one or more storage resources 140A-N (e.g., RAID level, mirroring, and so on), and/or the mode of the storage operation(s) (e.g., write-through cache, ephemeral cache, ECC encoding, and so on).

The storage module 130 disclosed herein may be leveraged and/or adapted to provide caching services. Accordingly, in some embodiments, the storage module 130 may comprise a cache management system (CMS). The CMS may comprise one or more of the modules of the storage module 130, disclosed herein. For clarity, however, these modules may be referenced using cache-specific terms when described in conjunction with the CMS.

Figure 2A:
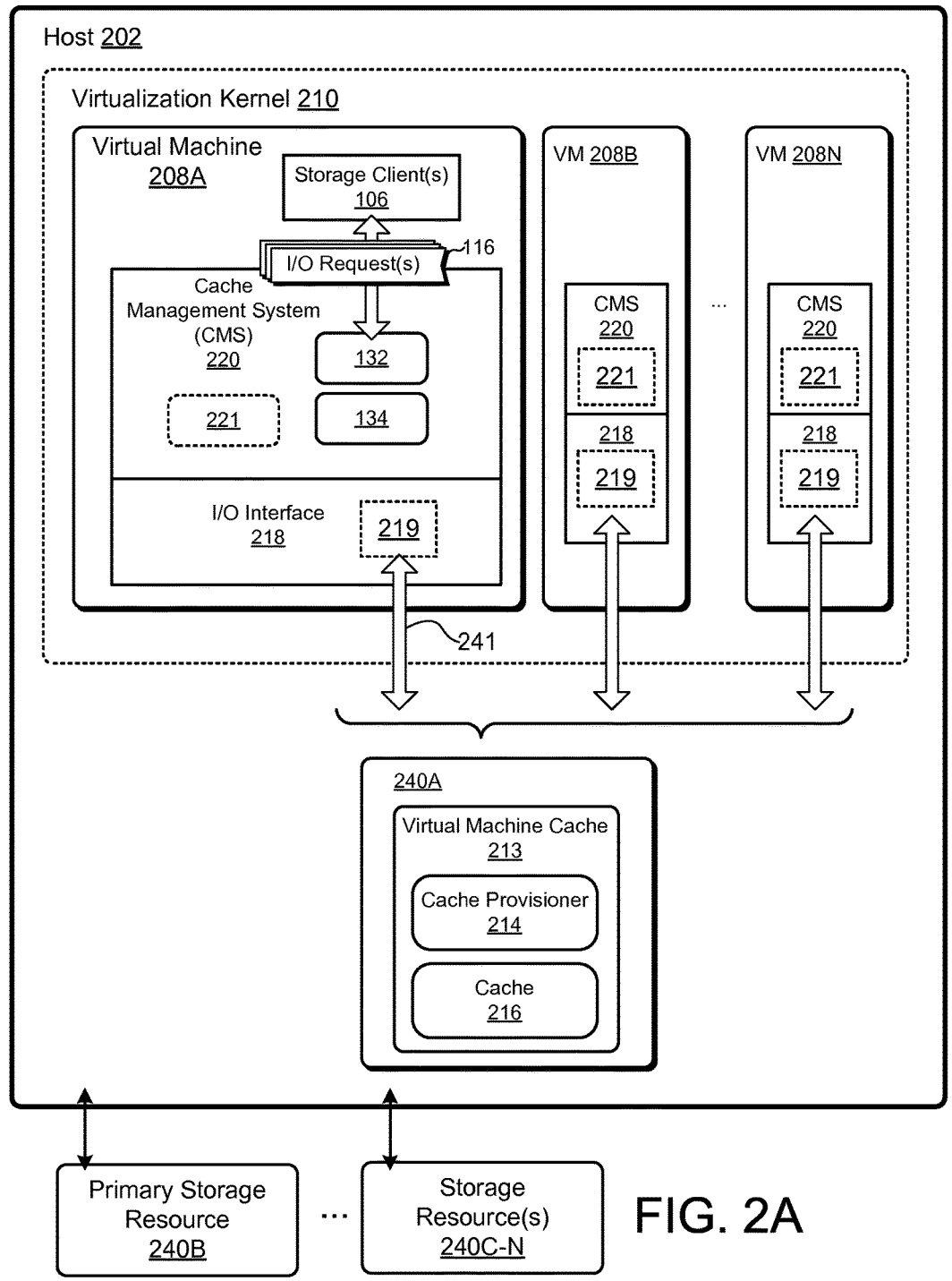
FIG. 2A is a block diagram of one embodiment of a virtual computing environment.

FIG. 2A is a block diagram of one embodiment of a CMS 220 in a virtualized computing environment. The CMS 220 may be configured to operate within a virtual machine 208A-N, which may operate within and/or in conjunction with a virtualization kernel 210. The virtualization kernel 210 may be configured to manage the operation of the virtual machines 208A-N operating on the host 202 as well as other components and services provided by the host 202. For example, the virtualization kernel 210 may be configured to handle various I/O operations associated with a primary storage resource 240B and/or other storage resources 240C-N. The primary storage resource 240B may be shared among the multiple virtual machines 208A-N across multiple hosts. The primary storage resource 240B may comprise multiple disk drives or other storage devices, such as one or more storage arrays (e.g., RAID, JBOD, or the like).

The CMS 220 may service I/O requests 116 of one or more storage clients 106. The storage clients 106 may be local to the virtual machine 208A, may be hosted within other virtual machines 208B-N deployed on the host 202, and/or may operate on other computing devices (e.g., on other hosts and/or remote computing environments, such as the remote storage client 106E of FIG. 1B). The CMS 220 may comprise an I/O request receiver module 132 configured to receive, monitor, and/or intercept I/O requests 116. The CMS 220 may be configured to service I/O requests 116 according to a particular level of persistence. Accordingly, the CMS 220 may comprise a persistence level module 134 configured to determine a persistence level for the I/O requests 116, as described herein, which may comprise selecting a caching mode for the I/O requests 116 (e.g., write-through, ephemeral, or other caching configuration or mode).

The I/O interface(s) 218 may be configured to access one or more virtualized storage resources, which may or may not be shared between other virtual machines 208A-N on the host 202. As used herein, a "virtualized storage resource" refers to a storage resource that is accessible through a virtualization kernel 210, such as a hypervisor, storage layer, virtualization layer, or the like. Virtualized storage resources may include, but are not limited to, VLUN storage resources, virtual disks (e.g., virtual machine disk format (VMDK) disks), storage module(s) 130, virtualized cache resources, and the like.

The CMS 220 may be configured to service I/O requests 116 by use of one or more virtualized storage resources 240A-N, including a virtual machine cache 213. The virtual machine cache 213 may comprise a cache provisioner module 214 and cache storage (cache 216). The cache 216 may include, but is not limited to, one or more memory devices, such as non-volatile storage devices and/or media, solid-state storage, Random Access Memory (RAM), or the like. As used herein, a "solid-state memory device" refers to a non-volatile, persistent memory that can be repeatedly erased and reprogrammed. Accordingly, a solid-state memory device may comprise a solid-state storage device and/or solid-state storage drive (SSD) (e.g., a Flash storage device). The cache provisioner module 214 may be configured to provision resources of the cache 216 to the CMS 220 of the virtual machines 208A-N, which may comprise dynamically provisioning and/or sharing cache storage and/or I/O operations (IOPS). The cache provisioner module 214 may be further configured to protect and/or secure data stored within the cache 216, to prevent more than one virtual machine 208A-N from accessing the same cache data (e.g., prevent read before write hazards). For example, in some embodiments, the cache provisioner module 214 is configured to associate cached data with a virtual machine identifier, which may be used to control access to data in the cache.

Figures 3, 4:
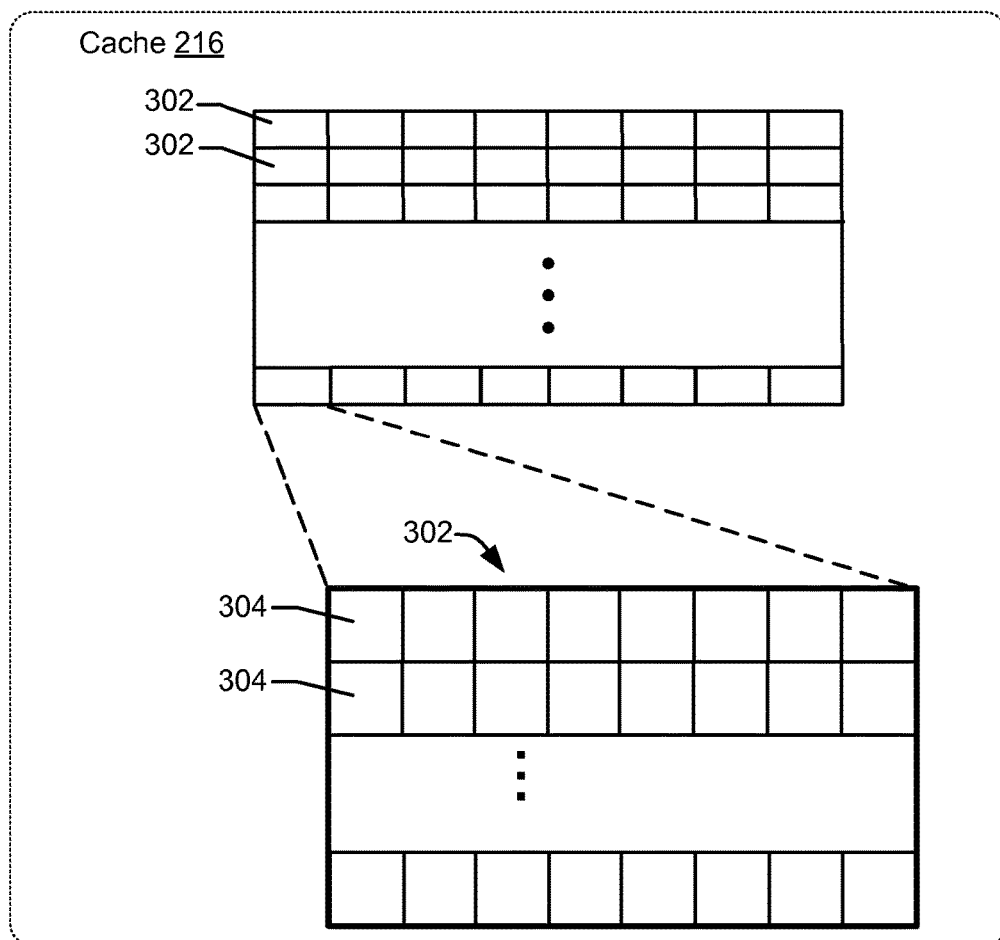
FIG. 3 is a block diagram of one embodiment of a cache.
FIG. 4 depicts one embodiment of a cache tag data structure.

FIG. 3 illustrates one embodiment of cache storage 216 of a virtual machine cache 213. The cache storage 216 may represent the cache storage resources 216 of the virtual machine cache 213. The cache storage 216 may comprise a solid-state storage medium, comprising a plurality of cache pages 304. The cache 216 may be broken into multiple chunks 302. As used herein a "chunk" refers to an arbitrarily sized portion of cache storage capacity. The cache 216 may be divided into any number of chunks 302 having any size. In a particular embodiment, each chunk 302 may comprise 256 MB (megabytes) of storage capacity. In this embodiment, the number of chunks 302 may be determined by the available storage capacity of the cache 216. For example, a 1 TB (terabyte) cache 216 divided into 256 MB chunks 302 contains 4,192 chunks. As shown in FIG. 3, each chunk 302 is divided into multiple cache pages 304.

The cache 216 may be shared between a plurality of virtual machines on a host. A cache chunk 302 may be assigned or allocated to a particular one of the virtual machines based upon, inter alia, the cache needs of the virtual machine and/or the cache needs of other virtual machines. The number of chunks 302 assigned to a particular virtual machine can change over time as the cache needs of the virtual machine change. The number of chunks 302 assigned to a specific virtual machine may determine the cache capacity of that virtual machine. For example, if two 256 MB chunks are assigned to a specific virtual machine, that virtual machine's cache capacity is 512 MB. The assignment of chunks 302 to particular virtual machines is handled by the cache provisioner, such as the cache provisioner module 214 described above.

The CMS 220 may comprise one or more cache tags 221 to map and/or associate identifiers (I/O addresses) of a virtual machine 208A-N to resources in the cache 216 (e.g., particular cache pages 304). The cache tags 221 may, therefore, be used to perform translations between identifiers in the cache tags 221 (e.g., address of blocks on a primary storage resource 240B) and a cache address. In some embodiments, cache tags 221 may be organized linearly in RAM or other memory. This allows the address of the cache tag 221 to be used to locate a physical cache page 304 because of the algorithmic assumption that each cache tag 221 has a linear 1:1 correspondence with a physical cache page 304. Alternatively, or in addition, cache tags 221 may be organized into another data structure, such as a hash table, tree, or the like.

Referring back to FIG. 2A, cache tags 221 associated with a particular virtual machine 208A-N may be stored within that virtual machine 208A-N. The cache tags 221 contain metadata that associates storage I/O addresses to specific cache pages 304 in the cache. In a particular embodiment, each cache tag 221 is associated with a particular page 304 in the cache. The virtual machine cache 213 may cache data for one or more storage resources 240B-N, such as the primary storage resource 240B (and/or other storage resources 240C-N). Accordingly, one or more of the storage resources 240B-N may be the primary storage and/or backing store of data cached in the virtual machine cache 213. In some embodiments, the I/O address of the cache tags 221 may be storage addresses and/or references to one or more of the storage resources 240B-N.

FIG. 4 illustrates one embodiment of a cache tag 221 data structure 421. The size of several fields in the cache tag 221 may be dynamic, and as such, the size of the cache tag data structure 421 may be dynamic. Each cache tag 221 provides a translation between an identifier (e.g., a storage I/O address) and a cache resource (e.g., a cache page 304). The cache tag data structure 421 includes a next cache tag index that is fixed in size and is used to link cache tags 221 in a hash table data structure. In operation, the next cache tag index is converted to a memory address to find the next cache tag linked to the current cache tag. A state field is fixed in size and identifies a current state of the cache tag 221. The access metadata field may comprise a dynamic field that indicates access and/or usage characteristics of the cache tag 221. The access metadata field may comprise clock hands metadata that indicates the number of clock hands (e.g., the number of time intervals) associated with the cache tag 221. The checksum field may comprise a dynamic field that varies in size based on the size of the cache page 304 and the level of integrity desired by the user. For example, a user can obtain a higher level of integrity for the checksum by allocating more bits of memory to the checksum.

The cache tag data structure 421 may further comprise a valid unit map field, which is a dynamic field that identifies which units in a page are cached. An example of a unit within a cache page 304 is a sector. For example, a particular cache page 304 may have one or more sectors that are missing or no longer valid. The valid unit map identifies the status of all units associated with a particular cache page 304 to prevent accessing data in units that is not valid.

The cache tag data structure 421 may further comprise a persistence metadata field. The persistence metadata field may comprise metadata pertaining to the persistence level of the cache tag 221, which may include, but is not limited to, the cache mode for the cache tag 221 (e.g., write-through, write-back, ephemeral, or other cache configuration or mode), the primary storage resource(s) 240B-N associated with the cache tag 221, and so on. The persistence metadata may be determined by the persistence level module 134 (by use of the persistence level policy 135) at the time the cache tag 221 is admitted into the cache. The CMS 220 (and/or persistence level module 134) may modify the persistence metadata in response to changes to the persistence level of the cache tag 221. For example, in some embodiments, a cache tag associated with ephemeral cache data may be flushed to a primary storage resource 240B-N, which may comprise modifying a cache mode of the cache tag 221 from ephemeral to another cache mode. The cache tag 221 may revert to an ephemeral cache mode (with a corresponding update to the persistence metadata). Further embodiments of cache tag data structures, clock hands metadata, and/or cache tag state transitions are disclosed in U.S. patent application Ser. No. 13/028,149, entitled, "Systems and Methods for Managing I/O Operations," filed Feb. 15, 2011, and published as United States Patent Application Publication No. 2012/0210043 on Aug. 16, 2012, which is hereby incorporated by reference.

As described above, the CMS 220 may be configured to receive I/O requests 116 from one or more storage clients 106, which may comprise receiving the I/O requests 116 via one or more interfaces 131A monitoring and/or intercepting I/O requests 116 within a storage stack 117 (e.g., by use of an agent 133, such as an I/O filter, a driver, or the like). The I/O requests 116 may be routed to the CMS 220, which may service the I/O requests using the virtual machine cache 213.

In response to a request to read data (e.g., a read I/O request 116), the CMS 220 may determine whether data pertaining to the I/O request 116 is available in the virtual machine cache 213, which may comprise determining whether the CMS 220 comprises a cache tag 221 that corresponds to the I/O request 116 (e.g., whether the CMS 220 comprises a cache tag 221 having an identifier corresponding to an identifier of the read request). If a cache tag 221 for the I/O request 116 is found, the CMS 220 may request the data from the virtual machine cache 213 using the cache address associated with the cache tag 221. If a cache tag 221 is not found, the CMS 220 may determine whether to admit the data into the virtual machine cache 213 (based on various cache admission policies and/or other factors, such as the availability of cache tags 221). The CMS 220 may admit the data into the virtual machine cache 213 by allocating a cache tag 221 corresponding to the request, accessing the data in the primary storage resource 240B, and instructing the virtual machine cache 213 to store the data in the cache 216. Admitting the data may further comprise determining a persistence level of the I/O request 116 using the persistence level module 134 and/or persistence level policy 135. The persistence level may specify a cache mode for data of the I/O request 116. For example, the persistence level of the I/O request 116 may specify that the data is to be stored in an ephemeral cache mode, such that the data is written to the virtual machine cache 213 and is not written-through to the primary storage resource 240B.

In response to a request to write data (e.g., a write I/O request 116), the CMS 220 may determine whether data pertaining to the request has been admitted into the virtual machine cache 213, as described above (e.g., by determining whether there is a cache tag 221 corresponding to the I/O request 116). If no cache tag 221 exists for the I/O request 116, the CMS 220 may determine whether to admit the data into the virtual machine cache 213, determine a persistence level of the I/O request 116, and so on, as described above. If a cache tag 221 exists, the CMS 220 may be configured to service the I/O request 116 according to a particular level of persistence as indicated by the persistence level module 134, which may, inter alia, determine a cache mode for the data (e.g., write-through caching, ephemeral caching, or the like). Servicing a write I/O request 116 according to an ephemeral persistence level may comprise storing data of the I/O request 116 in the virtual machine cache 213 without storing the data in a primary storage resource 240B. Servicing a write I/O request according to a write-through persistence level may comprise storing data of the I/O request in both the virtual machine cache 213 and one or more primary storage resources 240B. The I/O request 116 may not complete until data of the request is stored in the one or more primary storage resources 240B.

In some embodiments, the virtual machines 208A-N may be configured to be transferred and/or relocated from the host 202 to other host computing devices. The virtualization kernel 210 (or other virtualization layer) may be configured to prevent virtual machines that reference local resources of the host 202, such as local disk storage or the like, from being transferred. Accordingly, virtual machines 208A-N may be configured to access the virtual machine cache 213 using an access mechanism that does not prevent virtual machine migration. In some embodiments, the CMS 220 is configured to access the virtual machine cache 213 through emulated shared storage and/or a "virtual disk" or VLUN, which the virtualization kernel 210 treats as a shared device (and/or a device that does not prevent virtual machine migration). The virtual disk may be provided as a VMDK supported by the host 202 and/or virtualization kernel 210. In some embodiments, the I/O interface 218 may comprise an I/O filter 219 that is configured to monitor I/O operations of the virtual machines 208A-N, intercept I/O requests 116 and/or operations directed to the virtual disk, and forward the I/O requests 116 (and other, related data) to the virtual machine cache 213 via an interface 241. The I/O filter 219 may operate "above" an SCSI and/or vSCSI of the virtual machine 208A-N I/O stack 117. The I/O filter 219 may provide for passing I/O requests 116 (and responses) between the CMS 220 of the virtual machines 208A-N and the virtual machine cache 213. The I/O filter 219 may further provide for communicating other data, such as configuration, command, and/or control data. The virtual disk used to communicate between the CMS 220 and virtual machine cache 213 may be very small (e.g., a few megabytes), since the virtual disk is not used for actual storage, but as a communication interface between the CMS 220 and virtual machine cache 213.

The virtual machines 208A-N may be configured to emulate shared storage in other ways. For example, in some embodiments, the virtual machines 208A-N may be configured to replicate one or more "shared" VLUN disks across a plurality of hosts 202, such that, to the hosts, the VLUN disks appear to be shared devices. For instance, the VLUN disks may share the same serial number or other identifier. The host 202 and/or the virtualization kernel 210 may, therefore, treat the VLUN disks as shared devices, and allow virtual machines 208A-N to be transferred to and from the host 202. The VDMK approach described above may provide advantages over this approach, however, since a smaller number of "shared" disks need to be created, which may prevent exhaustion of limited storage references (e.g., a virtual machine may be limited to referencing 256 storage devices).

The cache provisioner module 214 may be configured to provision cache resources between the virtual machines 208A-N. The allocation information associated with a particular virtual machine (e.g., virtual machine 208A) may be communicated to the corresponding CMS 220, which may maintain cache tag 221 metadata in accordance with the cache resources that are allocated to the CMS 220. The CMS 220 may be configured to request cache resources from the cache provisioner module 214. The request may be transmitted in response to a CMS 220 initialization operation (e.g., cache "warm up"). As used herein, cache initialization refers to one or more operations to prepare the CMS 220 for operation. The CMS 220 may be configured to perform one or more initialization operations in response to the virtual machine 208A-N being powered on, restarted, transferred to a new host (e.g., in a VMotion™ operation), or the like.

The CMS 220 may be configured to maintain cache metadata, including cache tags 221 in accordance with the cache storage that has been allocated to the virtual machine 208A-N by the cache provisioner module 214. As used herein, a "cache tag" refers to an association between an identifier and a cache resource (e.g., a page or other cache storage location in the cache 216). Accordingly, the cache tags 221 may represent cache resources that have been allocated to a particular virtual machine 208A-N by the cache provisioner module 214. As used herein, an "identifier" of a cache tag 221 refers to an identifier used by the virtual machine 208A-N to reference data that has been (or will be) stored in the cache 216. A cache tag identifier may include, but is not limited to, a logical identifier, an address (e.g., a memory address, physical storage address, or logical block address, such as an address on the primary storage system 212), a name (e.g., file name, directory name, volume name, or the like), a reference, or the like.

The cache tags 221 may be stored within the respective virtual machines 208A-N (e.g., in volatile memory allocated to the virtual machine 208A-N by the host 202). In some embodiments, the cache tags 221 may represent a "working set" of cache data of the virtual machine 208A-N. As used herein, a "working set" of cache tags 221 refers to a set of cache tags that has been admitted and/or retained in the cache 216 by the CMS 220 through, inter alia, the application of one or more cache policies, such as cache admission policies, cache retention and/or eviction policies (e.g., cache aging metadata, cache steal metadata, least recently used (LRU), "hotness" and/or "coldness," and so on), cache profiling information, file- and/or application-level knowledge, and the like. Accordingly, the working set of cache tags 221 may represent the set of cache data that provides optimal I/O performance for the virtual machine 208A-N under a particular set of operating conditions.

In some embodiments, the CMS 220 may be configured to preserve and/or maintain the cache tags 221, which may comprise persisting the cache tags 221 in a non-volatile storage medium, such as the primary storage system 212, persistent cache storage device (e.g., cache 216), or the like. As used herein, a "snapshot" refers to the working set of the cache at a particular time. A snapshot may comprise all or a subset of the cache tags 221 (and/or related cache metadata). In some embodiments, a snapshot may further comprise "pinning" data in the cache device 216, which may cause data referenced by the one or more cache tags 221 to be retained in the cache 216. Alternatively, the snapshot may reference only the data identifiers, and may allow the underlying data to be removed (e.g., evicted) from the cache 216. The CMS 220 may be configured to load a snapshot from persistent storage, and to use the snapshot to populate the cache tags 221. A snapshot may be loaded as part of an initialization operation (e.g., cache warmup) and/or in response to configuration and/or user preference. For example, the CMS 220 may be configured to load different snapshots that are optimized for particular application(s) and/or service(s). Loading a snapshot may further comprise requesting cache storage from the cache provisioner module 214, as described above. In some embodiments, the CMS 220 may load a subset of a snapshot if the virtual machine 208A-N cannot allocate sufficient cache space for the full snapshot.

Figure 5:
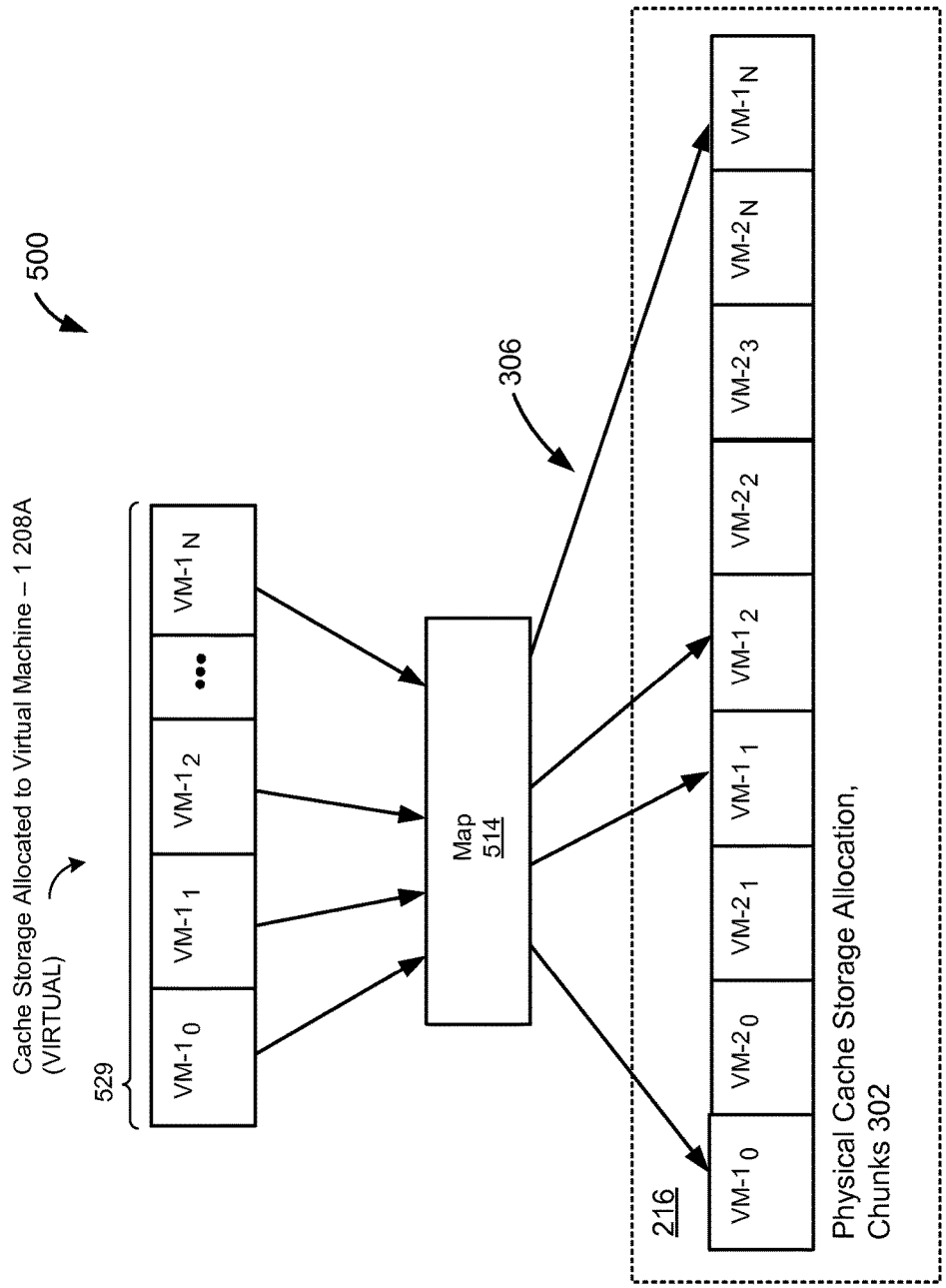
FIG. 5 depicts one embodiment of cache mappings.

In some embodiments, the cache provisioner module 214 is configured to maintain mappings between the virtual machines 208A-N and respective cache storage locations allocated to virtual machines 208A-N (e.g., as depicted in FIG. 5). The mappings may be used to secure cache data of the virtual machines 208A-N (e.g., by limiting access to the virtual machine 208A-N mapped to the cached data) and/or to provide for retaining and/or transferring cache data of one or more virtual machines 208A-N transferred from the host 202 to other, remote hosts, as described herein.

In some embodiments, the virtual machine cache 213 is configured to implement a "thin provisioning" approach to cache resource allocation. Each virtual machine 208A-N may be allocated a particular number of chunks 302 of the cache 216. However, the entire cache capacity of the cache 216 may be "published" to each of the virtual machines 208A-N (through a virtual disk, such as a VLUN or the like). For example, if the total cache size is 1 TB, each virtual machine 208A-N may report that it has access to the entire 1 TB of cache capacity. However, the actual allocation of cache chunks 302 may be considerably smaller (e.g., 256 MB or 512 MB), based on the current needs of the virtual machine 208A-N. The allocated cache chunks 302 represent a specific range of cache addresses available within the cache 216. The cache provisioner module 214 dynamically changes these cache chunk allocations as the working set requirements of the virtual machines 208A-N change (and/or virtual machines 208A-N are transferred to/from the host 202). Regardless of the number of cache chunks 302 actually allocated to a particular virtual machine 208A-N, that virtual machine 208A-N reports that it has access to the entire 1 TB cache. Accordingly, the guest operating system of the virtual machine 208A-N may operate with a virtual disk of size 1 TB. Accordingly, the actual storage space allocated to the virtual machine 208A-N can be changed dynamically without the guest operating system indicating an error condition. Therefore, the cache page 304 referenced by a cache tag 221 may correspond to an "indirect" address within the cache 216.

FIG. 5 depicts one embodiment of mappings 500 between virtual cache storage resources exposed to virtual machine 208A (VM-1) and underlying physical cache addresses actually allocated to the virtual machine 208A. The virtual cache storage allocated to the virtual machine 208A is depicted as a contiguous range of cache chunks VM-$1_0$, VM-$1_1$, VM-$1_2$ . . . VM-$1_N$ (529). The contiguous cache chunks 529 may be exposed through a fixed-size virtual disk 229, as described above. The physical cache storage actually allocated to virtual machine 208A is depicted as a discontiguous set of chunks VM-$1_0$, VM-$1_1$, VM-$1_2$, VM-$1_N$ within the physical address space 306 of the cache 216216. As depicted in FIG. 5, the chunks 302 in the physical address space 306 of the cache 216216 may be discontiguous and/or interleaved with chunks 302 allocated to other virtual machines 202B-N. Although the illustration in FIG. 5 shows some of the different locations in a physical order, the cache chunks 302 allocated to the virtual machine 208A may be located in a random order, in accordance with the availability of physical cache resources (e.g., available chunks 302).

The map module 514 may be configured to map virtual cache storage allocations (e.g., indirect cache addressees of the cache tags 221 within the virtual machine 208A) to physical cache resources (e.g., cache chunks 302 and/or cache pages 304). In some embodiments, the mapping may comprise an "any-to-any" index of associations between indirect cache addresses of the virtual machines 208A-N and the physical address space 306 of the cache 216.

In some embodiments, the virtual machine cache 213 may leverage the map module 514 to secure data stored in the cache 216. For example, the mappings of the map module 514 may be used as a form of access control, wherein access to physical cache chunks 302 is restricted to the virtual machine to which the physical cache chunk 302 is mapped and/or allocated. For example, the cache chunk labeled VM-$1_0$ may only be accessible to the virtual machine to which the chunk 302 is mapped (e.g., virtual machine 208A). Moreover, by virtue of the indirect accessing of the mapping layer, the virtual machines 208A-N may be incapable of directly referencing and/or addressing physical cache chunks 302 of other virtual machines 208A-N.

The map module 514 may be configured to map virtual cache storage using the VMID of the corresponding virtual machine. Accordingly, when a virtual machine is transferred and/or migrated between hosts 202, mappings between the VMID and cache data of the virtual machine may remain valid (e.g., given the VMID, the retained cache data of the corresponding virtual machine 208A-N may be identified and accessed). Further embodiments of systems and methods for dynamically allocating cache storage in a virtualized environment are disclosed in U.S. patent application Ser. No. 13/192,365, entitled, "Managing Data Input/Output Operations," filed on Jul. 27, 2011, which is hereby incorporated by reference.

Figure 2B:
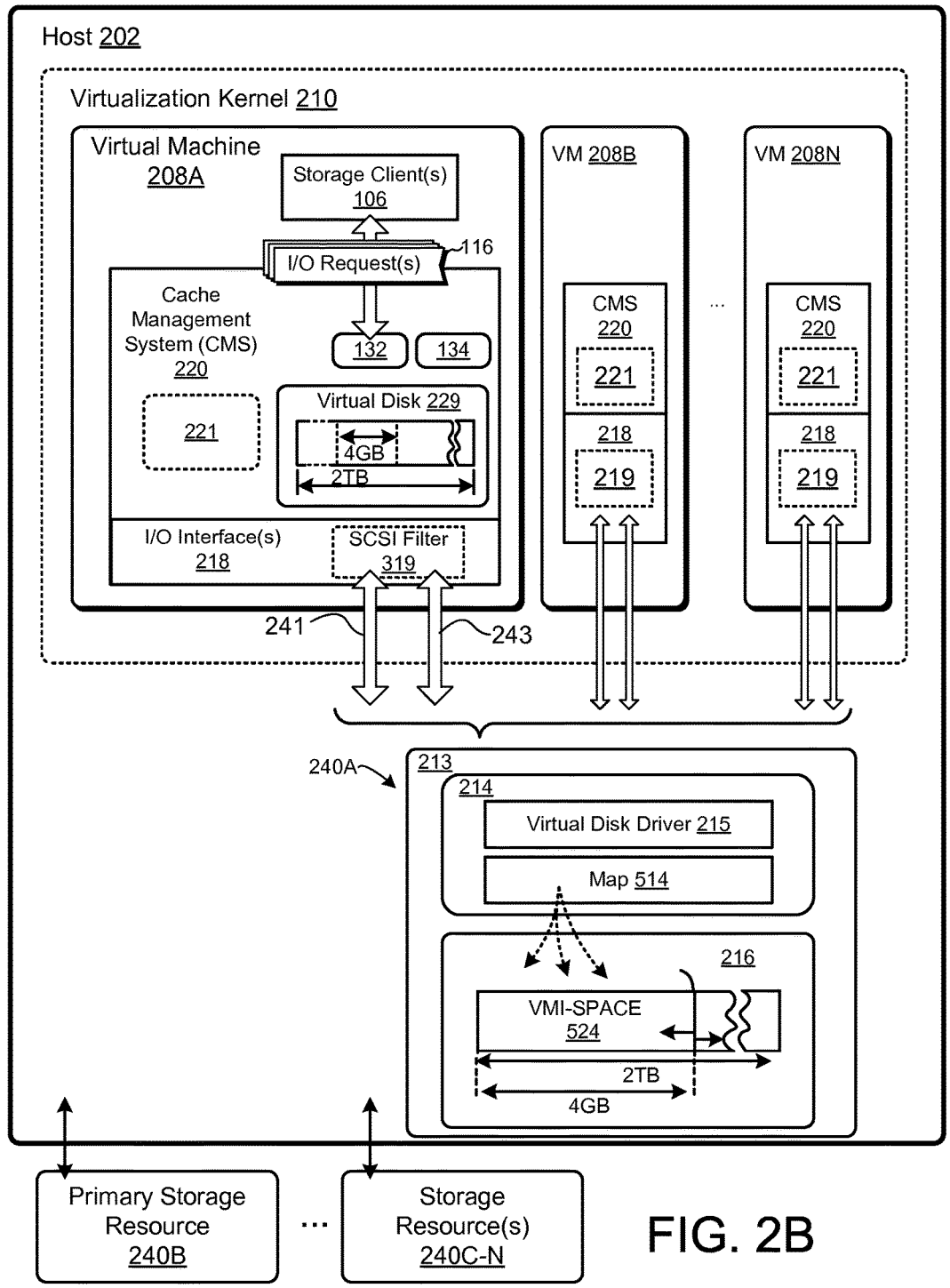
FIG. 2B is a block diagram of another embodiment of a virtual computing environment.

Referring to FIG. 2B, the cache provisioner module 214 may be configured to dynamically allocate cache resources to the virtual machines 208A-N. Once provisioned, each virtual machine 208A-N may have access to a predetermined and/or contiguous range of cache storage resources (e.g., cache chunks 302 and/or cache pages 304). The cache provisioner module 214 may be configured to divide the cache 216 into cache chunks 302 that can be dynamically provisioned to respective virtual machines 208A-N.

In some embodiments, the virtual machines 208A-N may be configured for use with disks having a fixed size, and may operate improperly if there is a sudden atypical change to the size of a disk (e.g., virtual disk 229). Accordingly, the cache provisioner module 214 may be configured to expose cache storage resources that appear to have a fixed size, while providing for dynamic reallocation of the underlying cache resources. According to some embodiments, and as depicted in FIG. 2B, the cache provisioner module 214 may emulate fixed-sized cache resources using a virtual disk driver 215, which may be configured to expose respective virtual disks (VLUN disks) 229 within the virtual machines 208A-N. The cache tags 221 may, therefore, reference cache resources in the virtual disk 229, which may indirectly reference physical cache resources within the cache 216 (e.g., the cache tags 221 may comprise indirect references to cache resources per a virtual disk mapping of the map module 514, as described herein). The virtual disks 229 may appear to have a fixed size comprising the full capacity of the cache 216 (e.g., 2 TB), whereas only a portion of the cache 216 is actually allocated to the virtual machine 208A-N (e.g., 4 GB) per the cache provisioner module 214. Accordingly, the cache provisioner module 214 may be configured to dynamically allocate cache storage to virtual machines 208A-N without adversely affecting the operation of the virtual machines 208A-N. The virtual disk driver 215 and/or the map module 514 may manage the mappings between indirect references of the virtual machines 208A-N and physical cache resources.

The cache provisioner module 214 may be configured to dynamically allocate different amounts of cache storage to the virtual machines 208A-N in accordance with different cache requirements of the virtual machines 208A-N. The cache provisioner module 214 may comprise a map module 514 configured to map virtual storage resources exposed to the virtual machines 208A-N (via a virtual disk 229) to physical addresses in the cache 216.

As described above, the virtual disk driver 215 may be configured to present fixed-sized, contiguous cache storage allocations to the virtual machines 208A-N (through respective virtual disks 229). The map module 514 may be configured to map references to the virtual disk 229 to physical cache addresses (e.g., cache chunks 302 and/or cache pages 304). For example, the cache storage provisioned to the virtual machine 208A is illustrated diagrammatically as space 524 in the cache 216. The cache space 524 may comprise 4 GB. However, the virtual disk driver 215 may represent this limited cache capacity as a fixed 2 TB virtual disk 229. Moreover, the cache capacity (cache chunks 302) allocated to the virtual machines 208A-N may be disbursed within the physical address space of the cache 216 in an arbitrary manner (the chunks 302 may be discontiguous), whereas the cache capacity represented through the virtual disk 229 may be contiguous. The cache provisioner module 214 may be configured to dynamically shift cache storage allocations between the virtual machines 208A-N in response to changing cache requirements and/or as virtual machines 208A-N are transferred to and from the host 202.

The CMS 220 may be configured to interface with the virtual machine cache 213 through one or more I/O interfaces 218. The CMS 220 may comprise a SCSI filter 319 of I/O interface 218, which may be configured to communicate data and/or control information between the virtual machine 208A (and the CMS 220 operating therein) and the virtual machine cache 213 (via the virtual disk 229). In some embodiments, the SCSI filter 319 may be incorporated into an I/O stack (or other I/O infrastructure and/or messaging system) of the virtual machine 208A. The SCSI filter 319 may be configured to identify the virtual disk 229, respond to allocation changes within the virtual disk 229 (e.g., dynamic allocation by the cache provisioner module 214), and so on. As described above, the virtual disk 229 may be configured to report a larger, fixed storage capacity than the actual physical cache capacity allocated to the virtual machine 208A, such that the cache provisioner module 214 can dynamically provision cache storage without adversely affecting the virtual machine 208A. In some embodiments, the SCSI filter 319 may be configured to manage the actual physical capacity of the virtual disk 229, which may be hidden from other applications and/or operating systems of the virtual machine host 202. For example, the VLUN disk 229 may be presented as a read-only storage device, which may prevent other applications within the virtual machine 208A and/or host 202 from writing data to the virtual disk 229.

The cache provisioner module 214 may report the actual physical cache storage allocated to the virtual machine 208A by way of a communication link 243 comprising the SCSI filter 319. The communication link 243 may operate separately from I/O traffic between the virtual disk driver 215 and the SCSI filter 319. Thus, asynchronous out-of-band messages may be sent between the virtual disk driver 215 and the SCSI filter 319. The SCSI filter 319 may report allocation information (and other command and/or control information) to the CMS 220, which may use the allocation information to determine the number of cache tags 221 available to the virtual machine 208A. Accordingly, the cache may be thinly provisioned with respect to the virtual machines 208A-N, and cache allocations may vary dynamically, in accordance with the cache requirements of the virtual machines 208A-N.

Figure 6:
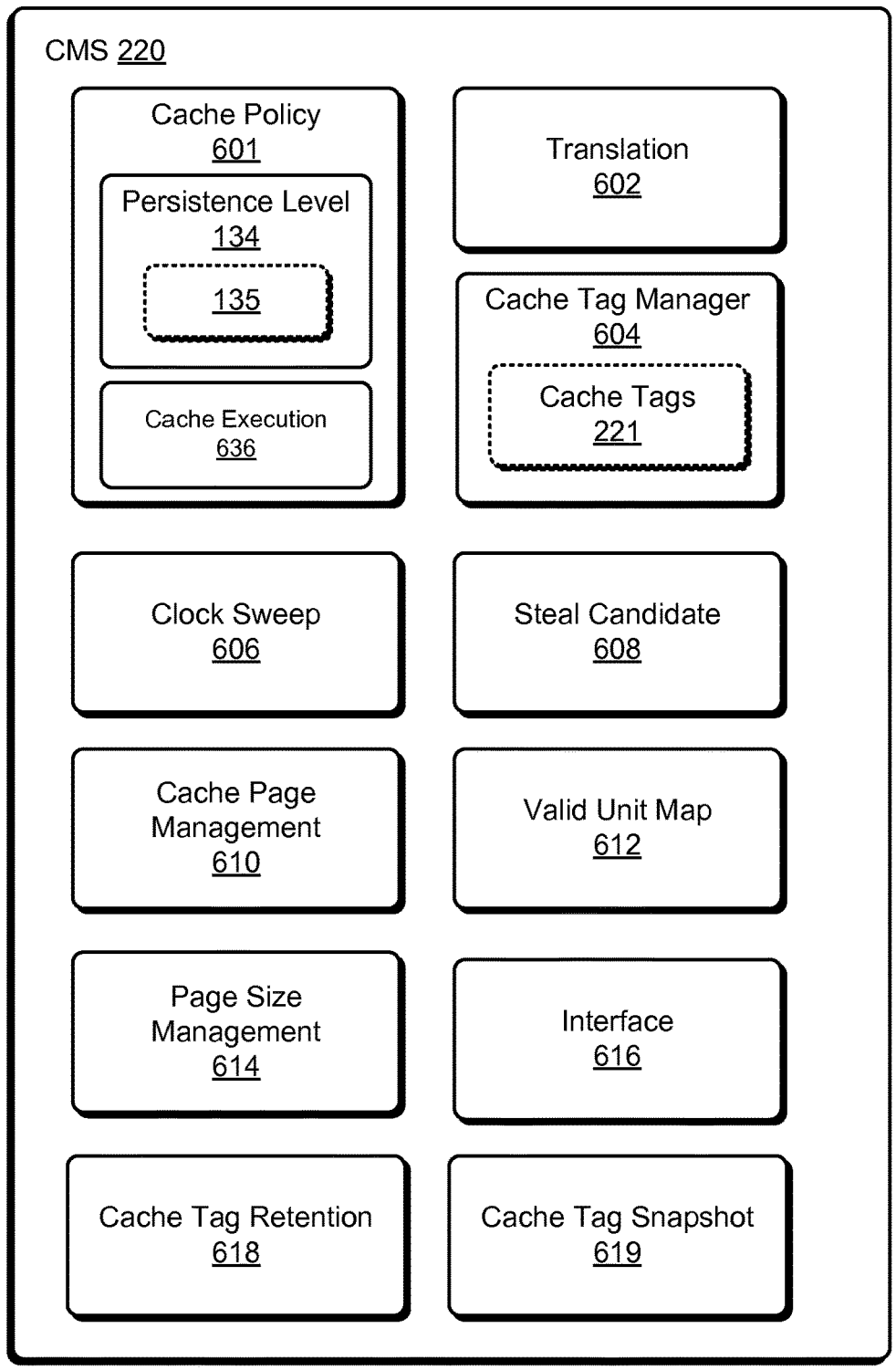
FIG. 6 depicts one embodiment of a cache management system.

FIG. 6 is a block diagram depicting one embodiment of a CMS 220. The CMS 220 may comprise one or more modules, including a cache policy module 601, address space translation module 602, a cache tag manager 604, a clock sweep module 606, a steal candidate module 608, a cache page management module 610, a valid unit map module 612, a page size management module 614, an interface module 616, a cache tag retention module 618, and a cache tag snapshot module 619.

The cache policy module 601 may be configured to select data for admission into the cache based on various cache admission criteria and/or policy. The cache policy module 601 may be further configured to determine a persistence level for data admitted into the cache. The persistence level may, inter alia, determine a caching mode and/or configuration for the data, such as write-through, write-back, ephemeral, or the like. In some embodiments, the cache policy module 601 comprises a persistence level module 134 and persistence level policy 135 for assigning persistence levels to cache data. Alternatively, or in addition, the persistence level of data to be admitted into the cache may be determined by another entity or process, such as a storage module 130, as described herein. The CMS 220 may further comprise a cache execution module 636, which may be configured to cache data according to a selected persistence level. The cache execution module 636 may, therefore, be configured to cache data in one or more different cache modes and/or configurations. For instance, the cache execution module 636 may be configured to cache data in a write-through cache mode, which may comprise servicing write I/O requests 116 by writing data to one or more primary storage resources 240B-N and to the virtual machine cache 213. The CMS 220 may not acknowledge completion of the write I/O request 116 until the data is written to the one or more primary storage resources 240B-N. The cache execution module 636 may be configured to cache data in an ephemeral cache mode, which may comprise servicing write I/O requests 116 by writing data to the virtual machine cache 213 without storing the data in a primary storage resource 240B-N or other backing store. Accordingly, the CMS 220 may acknowledge completion of a write I/O request 116 assigned an ephemeral cache mode in response to writing the data to the virtual machine cache 213.

The translation module 602 may be configured to correlate logical identifiers (e.g., addresses in a primary storage system) of the cache tags 221 with cache storage locations (e.g., cache addresses, cache chunks 302, cache pages 304, or the like) within the virtual machine cache 213. As described above, the cache tags 221 may correspond to "indirect" and/or "virtual" cache storage resources within a virtual disk 229, which may be mapped to physical cache storage resources (e.g., cache chunks 302) by the cache provisioner module 214 and/or map module 514.

The cache tag manager 604 may be configured to manage the cache tags allocated to the CMS 220, as described herein, which may comprise maintaining associations between virtual machine identifiers (e.g., logical identifiers, addresses, primary storage addresses) and data in the cache 216, and maintaining cache metadata, such as access characteristics, persistence level, cache mode, and the like.

The clock sweep module 606 may be configured to determine and/or maintain cache aging metadata using, inter alia, one or more clock hand sweep timers. The steal candidate module 608 may be configured to identify cache data and/or cache tags that are candidates for eviction based upon, inter alia, clock sweep metadata, or other cache policy. In some embodiments, the steal candidate module 608 may be configured to predicate cache tag eviction reference on persistence level metadata of the cache tags 221. For example, the steal candidate module 608 may not select cache tags 221 that are cached in an ephemeral cache mode for eviction. Alternatively, the steal candidate module 608 may first flush ephemeral cache tags 221 to a primary storage resource 240B-N before eviction.

The cache page management module 610 may be configured to manage cache resources (e.g., cache page data) and related operations. The valid unit map module 612 may be configured to identify valid data stored in the virtual machine cache 213 and/or a primary storage resource 240B. The page size management module 614 may be configured to perform various page size analysis and adjustment operations to enhance cache performance, as described herein. The interface module 616 may be configured to provide one or more interfaces to allow other components, devices, and/or systems to interact with the CMS 220.

The cache tag retention module 618 may be configured to retain cache tags 221 in response to transferring the CMS 220 to a different host. As described above, the cache tags 221 may represent a working set of the cache, which may be developed through the use of one or more cache admission and/or eviction policies (e.g., the clock sweep module 606 and/or steal candidate module 608), and in response to the I/O characteristics of the virtual machine 208 (and/or the applications running on a virtual machine 208A-N). The cache tag retention module 618 may be configured to retain the cache tags 221 after the virtual machine 208 is transferred to a new host 202 (e.g., transferred from host 202A to host 202B in, inter alia, a VMotion™ operation) despite the fact that the underlying cache data to which the cache tags refer may not be available on the cache storage device of the new host. The virtual machine cache 213 described herein, however, may be configured to populate the cache 216 at the new host, such that the CMS 220 can continue to use the working set of cache tags 221.

As described above, data of the retained cache tags 221 may be transferred to the new host from the previous host (and/or from primary storage resources 240B-N, or other source). The cache data may be transferred via a demand paging model, which may comprise populating the cache "on demand," as the cache data of various retained cache tags 221 is requested by the virtual machine 208. Alternatively, or in addition, cache data may be prefetched and/or transferred in a "bulk transfer" operation, which may comprise transferring cache data independent of requests for the cache tag data. In some embodiments, data may be selectively prefetched based upon a cache transfer policy, which may be based, at least in part, on the cache aging metadata of the clock sweep module 606 and/or steal candidate module 608 and/or other cache policy metadata (e.g., hotness, coldness, least recently used, or the like).

The cache tag snapshot module 619 may be configured to maintain one or more "snapshots" of the working set of the cache (e.g., the cache tags 221). As described above, a snapshot refers to a set of cache tags 221 at a particular time. The snapshot module 619 may be configured to store a snapshot of the cache tags 221 on a persistent storage medium and/or load a stored snapshot, as described above.

As described above, the CMS 220 may be configured to cache data according to one or more different levels of persistence, which may correspond to caching data in one or more different cache modes and/or on one or more different primary storage device(s) 240B. The CMS 220 may utilize adaptive persistence levels to improve I/O performance and/or increase the consolidation ratio of the host 202. As used herein, a "consolidation ratio" of a host 202 refers to the number of virtual machines 208A-N that can operate on the host 202. The number of virtual machines 208A-N that can operate on the host 202 may be limited by the computing resources of the host 202 and/or the I/O overhead of the hosts 202.

In highly consolidated VDI environments, the virtual machines 208A-N may share common I/O characteristics, which may strain the I/O infrastructure of the host 202. The virtual machines 208A-N may share similar data sets (e.g., operating systems, applications, user profile information, or the like), and the virtual machines 208A-N may be configured to access this common data at similar times (e.g., during boot up, power on, at log-in time, or the like). The resulting "boot storms" may overwhelm the primary storage resources 240B-N and/or I/O infrastructure of the host 202, which may significantly degrade overall system performance. Similar file access "storms" may occur in response to the virtual machines 208A-N loading particular applications, accessing shared data, accessing user profile information, executing a login process, and so on. Moreover, each of the virtual machines 208A-N may comprise a respective CMS 220, each of which may admit similar data sets into the shared virtual machine cache 213, which may fill the virtual machine cache 213 with duplicative data. Embodiments of systems and methods for improving performance of read-centric I/O operations are disclosed in U.S. patent application Ser. No. 13/750,904, entitled, "Systems and Methods for a De-Duplication Cache," filed Jan. 25, 2013, and which is hereby incorporated by reference.

The performance of write-centric I/O operations may be improved by use of the adaptive persistence levels disclosed herein. For example, a virtual machine 208A-N may issue a large number of I/O requests 116 to write data that does not need to be preserved for a long period of time (e.g., does not need to be retained between reboot cycles). Such data may be considered to be ephemeral (e.g., "temporary," "disposable," and/or "dispensable" data). As used herein, a "reboot cycle" or "restart operation," comprises an intentional or unintentional restart and/or reboot of the computing environment 110 and/or storage module 130, which may be caused by, inter alia, a loss of power, a hardware fault, a software fault, an intentional shutdown or restart, or the like. Accordingly, a restart operation may comprise a system reboot, reset, or shutdown event; a power fault, power loss, or power failure event; or another interruption of power. Ephemeral data may be of critical importance while the computing device (e.g., virtual machine 208A-N) is operating, but may not be needed after a reboot cycle and/or restart event. Examples of such data include, but are not limited to, swap files, such as virtual memory files (e.g., pagefile.sys or the like); temporary files, such as the contents temporary directories (e.g., /tmp or the like); temporary application files (e.g., local cache of Microsoft Word® or the like); and so on. By contrast, "permanent" data refers to data that should be retained between boot cycles and/or restart events.

In some embodiments, the CMS 220 is configured to identify I/O requests pertaining to dispensable data and may cache data of the I/O requests in an ephemeral cache configuration. As disclosed above, an ephemeral cache configuration refers to a cache mode in which data is written to (and/or read from) cache storage, but is not written-through, written-back, and/or copied to a primary storage resource 240B-N. Accordingly, data stored in an ephemeral cache may be lost when the data is evicted from the cache and/or if the cache is lost in a reboot, crash, or the like.

Storing data in an ephemeral cache mode and/or configuration may provide significant performance benefits: I/O requests 116 pertaining to ephemeral cache data do not require accesses to primary storage resources 240B-N, and the latency associated with primary storage resources 240B-N may be removed from the "critical path" for servicing I/O requests 116. As used herein, the "critical path" refers to the timing and/or latency path of an I/O operation. As described above, in write-through cache configurations, write I/O requests 116 may not complete (e.g., return control to the storage client 106A-N) until data is written-through to primary storage resources 240B-N. Therefore, the critical path of the I/O operation comprises one or more high-latency primary storage accesses. By contrast, cache operations pertaining to ephemeral data may be completed exclusively within the cache, without accessing primary storage resources 240B-N. Accordingly, the critical path of an ephemeral I/O operation does not include high-latency accesses to primary storage resources 240B-N. Therefore, in addition to reducing the latency for storage clients 106A-N, ephemeral caching may provide the additional benefit of reducing the I/O bandwidth and/or load on the primary storage resources 240B-N.

In some embodiments, the CMS 220 may identify data for ephemeral caching based upon a persistence level of the I/O request 116 as determined by a cache policy module 601 and/or persistence level module 134, which may determine a persistence level for an I/O request according to a persistence level policy 135 (e.g., persistence level criteria), which may be based on one or more of properties of the I/O requests 116, inferences drawn from the I/O requests 116, profiling metadata pertaining to the I/O requests 116, file-level knowledge, application-level knowledge, preferences and/or configuration, testing and experience, and so on.

Figures 7A, 7B:
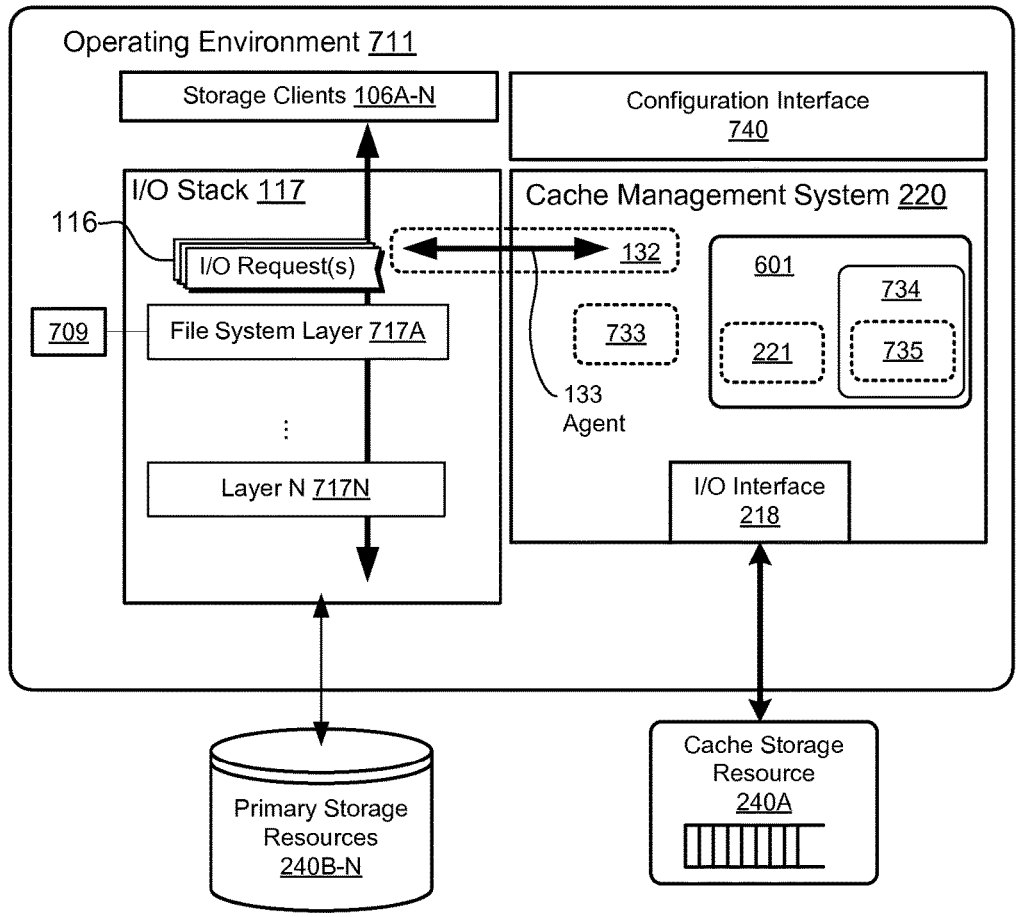
FIG. 7A is a block diagram of another embodiment of a cache management system.
FIG. 7B depicts one embodiment of a persistence-level policy.

FIG. 7A is a block diagram of another embodiment of a CMS 220. The CMS 220 may comprise and/or be communicatively coupled to a cache storage resource 240A via an I/O interface 218. The CMS 220 may be deployed within an operating environment 711, which may comprise an operating system operating on a bare-metal computing environment. Accordingly, the CMS 220 may be configured to access the cache storage resource 240A directly via the I/O interface 218; the I/O interface 218 may comprise an API, a bus, a protocol, or the like. In some embodiments, the operating environment 711 may be a virtual operating environment, such as a virtual operating system, guest operating system, or the like. The CMS 220 may be configured to access a virtualized cache storage resource 240A, which may be represented as a virtual disk 229, as described above. The CMS 220 may be further configured to transfer data, control, and/or configuration data to and from the cache storage resource 240A via an SCSI filter 319, as described above.

The I/O request receiver module 132 of the CMS 220 may comprise an agent 133 that is configured to monitor I/O requests in an I/O stack 117 of the operating environment 711. The I/O stack 117 may comprise a plurality of layers 717A-N, including a file system layer 717A. The agent 133 may be configured to monitor I/O requests 116 within any of the layers 717A-N. The I/O requests may relate to file operations, such as file open, close, read, write, modify, and the like. The agent 133 may monitor other types of I/O requests, such as volume mount and/or unmount, disk mount and/or unmount, paging I/O, and so on. The agent 133 may monitor I/O requests 116 using an interface provided by the computing environment 111, the I/O stack 117, and/or the like. Accordingly, the agent 133 may comprise one or more I/O monitors, file-filter drivers, volume-filter drivers, SCSI filter drivers, and/or other suitable monitoring and/or filtering modules.

The CMS 220 may comprise a cache policy module 601, which may, inter alia, define cache admission criteria, cache eviction criteria, and so on. Accordingly, the cache policy module 601 may comprise a clock sweep module, steal candidate module, cache tag retention module, and/or a cache tag snapshot module, as described herein. The CMS 220 may use the cache policy module 601 to make cache admission and/or eviction decisions based upon cache access metadata, admission criteria (e.g., file selection criteria), and so on.

In some embodiments, the cache policy module 601 may be further configured to determine and/or assign a persistence level to I/O requests 116. The persistence level of an I/O request may determine, inter alia, a cache mode and/or configuration for data admitted into the storage resource 240A. Accordingly, the cache policy module 601 may comprise a persistence level module 734 configured to determine a persistence level of I/O request data, as described herein. In some embodiments, determining and/or assigning a persistence level to an I/O request 116 may comprise applying persistence level criteria to one or more characteristics of the I/O request 116, which may include file-level criteria, such as file name, path, directory, volume, or the like. FIG. 7B depicts one embodiment of a persistence level policy 735. As depicted in FIG. 7B, the persistence level criteria 737 pertain to file-related characteristics of I/O requests 116. The persistence level policy 735 may map particular file names (e.g., "pagefile.sys"), file paths, and/or volumes to respective persistence levels 739. Files pertaining to temporary, disposable data, such as the "pagefile.sys" and/or "local cache" data, may be assigned a persistence level 739 that specifies an ephemeral (write-never) cache mode. Other potential characteristics of the persistence level 739 are omitted to avoid obscuring the details of these embodiments.

The persistence level policy 735 may specify other types of persistence levels. For example, data of important files may be stored in a persistence level 739 indicating a write-through caching mode. The persistence level 739 may further indicate that the data is to be stored in one or more redundant storage resources 240B-N (e.g., in a particular RAID level, mirroring configuration or the like). In response, the CMS 220 may be configured to write-through data of I/O requests 116 pertaining to files that satisfy the "\\Application\critical data" file-selection criteria to a redundant primary storage resource 240A-N and/or in a corresponding storage mode. Other storage services, such as the storage module 130 (not shown in FIG. 7A), may leverage the persistence level policy 735 to store data according to the persistence level(s) designated therein regardless of whether the particular I/O request 116 is serviced by the CMS 220.

The persistence level policy 735 may incorporate other I/O request characteristics in addition to and/or in place of file-related characteristics. For example, the persistence level policy 735 may identify and/or designate applications known to make use of temporary, dispensable write operations, such that I/O requests 116 of such applications are cached according to a persistence level 739 comprising an ephemeral cache configuration. For instance, the persistence level criteria 737 may indicate that I/O requests 116 originating from the Word® application and directed to files in a local cache should be serviced in an ephemeral persistence level 739. The persistence level policy 735 may further comprise default and/or wildcard criteria, such as a default, write-through cache mode persistence level 739.

The CMS 220 may be configured to transparently extend an existing cache manager 709 of the operating environment 711. Accordingly, the CMS 220 and/or agent 133 may be configured to distinguish different I/O request types including, but not limited to, non-paging I/O requests, paging I/O requests, direct I/O requests, and the like. The CMS 220 and/or agent 133 may be configured to ignore certain types of I/O requests 116, such as direct I/O requests that are expected to access primary storage resources 240B-N directly and/or non-paging I/O requests pertaining to the existing cache manager 709.

As disclosed herein, the persistence level module 134 assigns a persistence level to an I/O request 116 based, at least in part, on a target and/or source of the I/O request 116 (e.g., file name). In some embodiments, the CMS 220 may maintain I/O request metadata 733, which may include, but is not limited to, the source identifier of I/O requests 116 (e.g., file name, path, or the like), the persistence level of the I/O requests 116, and the like. The agent 133 may generate context metadata 733 in response to detecting an initial I/O request 116 pertaining to a file operation, such as a file open, read, copy, delete, create, truncate, modify, write, or the like. The agent 133 may use the I/O request metadata (e.g., context) 733 to associate the I/O request 116 (and subsequent, related I/O requests 116) with a corresponding source identifier, such as file identifier, file name, volume identifier, disk identifier, or the like. In some embodiments, the agent 133 may include an indication of whether a particular file (and/or corresponding I/O request) is cacheable (pertains to data that should be admitted into the cache) and/or the persistence level of the I/O request 116. The CMS 220 may access the I/O request metadata 733 to determine whether subsequent I/O requests 116 should be cached and/or determine the persistence level of the I/O requests 116, without re-applying cache admission criteria and/or the persistence level policy 735. The I/O request metadata 733 may comprise context data of an I/O request 116 and/or may be maintained in a separate datastructure. The I/O request metadata 733 may be stored in any suitable datastructure (e.g., table, hash table, map, or tree), and may be indexed by source identifier, file name, or the like.

In one example, a storage client 106A-N may open a plurality of files, resulting in corresponding file open I/O requests 116. The agent 133 may associate the I/O requests 116 with corresponding I/O request metadata 733, which may include a source identifier of the file, an indication of whether the file should be admitted into the cache, a persistence level of the I/O requests 116, and so on. The storage client 106A-N may perform I/O operations on the files, which may be serviced using the existing cache manager 709, and which may be ignored by the agent 133. In accordance with cache policy of the computing environment 111, the existing cache manager 709 may be flushed, resulting in one or more paging I/O requests 116, which may be detected by the agent 133. In response, the agent 133 may access the I/O request metadata (e.g., context) 733 of the paging I/O requests 116 to determine the source identifier(s) of the requests, determine whether the I/O requests 116 pertain to data to be admitted into the cache, determine a persistence level of the I/O requests 116, and so on. I/O requests 116 that pertain to data that is to be admitted into the cache may be serviced using the CMS 220 in accordance with an assigned persistence level, as described herein.

As disclosed above, the persistence level of the I/O requests 116 may be predicated on persistence level policy 735, such as persistence level criteria 737. The persistence level policy 735 may be configurable by a user (or other entity, such as a profiling process, or the like). The CMS 220 may comprise a configuration interface 740, through which persistence level policy 735 and/or persistence level criteria 737 may be specified.

In some embodiments, the CMS 220 may be configured to modify a persistence level of a cache tag 221 during operation. For example, the CMS 220 may be configured to "flush" data stored in an ephemeral cache configuration to primary storage resource 240B-N. As used herein, flushing ephemeral cache data comprises storing the ephemeral cache data in a primary storage resource 240B-N and/or evicting the data from the cache. Ephemeral cache data may be evicted in response to an I/O request 116 pertaining to certain types of I/O requests 116 (e.g., unhandled I/O requests 116, such as truncate, transactional, or the like). In response to such an I/O request 116, the CMS 220 may be configured to flush the ephemeral cache data to primary storage resource(s) 240B-N, allow the operating environment 711 to service the I/O request 116, and re-admit the data into the cache (in ephemeral cache mode and/or configuration).

The CMS 220 may be further configured to manage I/O conflicts pertaining to ephemeral cache data. In some embodiments, the CMS 220 handles I/O conflicts (e.g., concurrent requests for access to a cache tag 221) by invalidating the cache tag 221, which may comprise evicting the data from the cache. The CMS 220 may handle ephemeral cache data differently. Since ephemeral cache data is only stored within the cache (and flushing the ephemeral cache data requires a high-latency access to primary storage resources 240B-N), the CMS 220 may be configured to schedule and/or defer conflicting requests rather than invaliding the ephemeral cache tag 221.

Further embodiments of systems and methods for caching data according to I/O requests in an I/O stack 117 are disclosed in U.S. patent application Ser. No. 13/287,998, entitled, "Systems and Methods for a File-Level Cache," filed Aug. 25, 2012, and U.S. patent application Ser. No. 13/288,005, entitled, "Systems and Methods for a Multi-Level Cache," filed Aug. 25, 2012, both of which are hereby incorporated by reference.

Figure 7C:
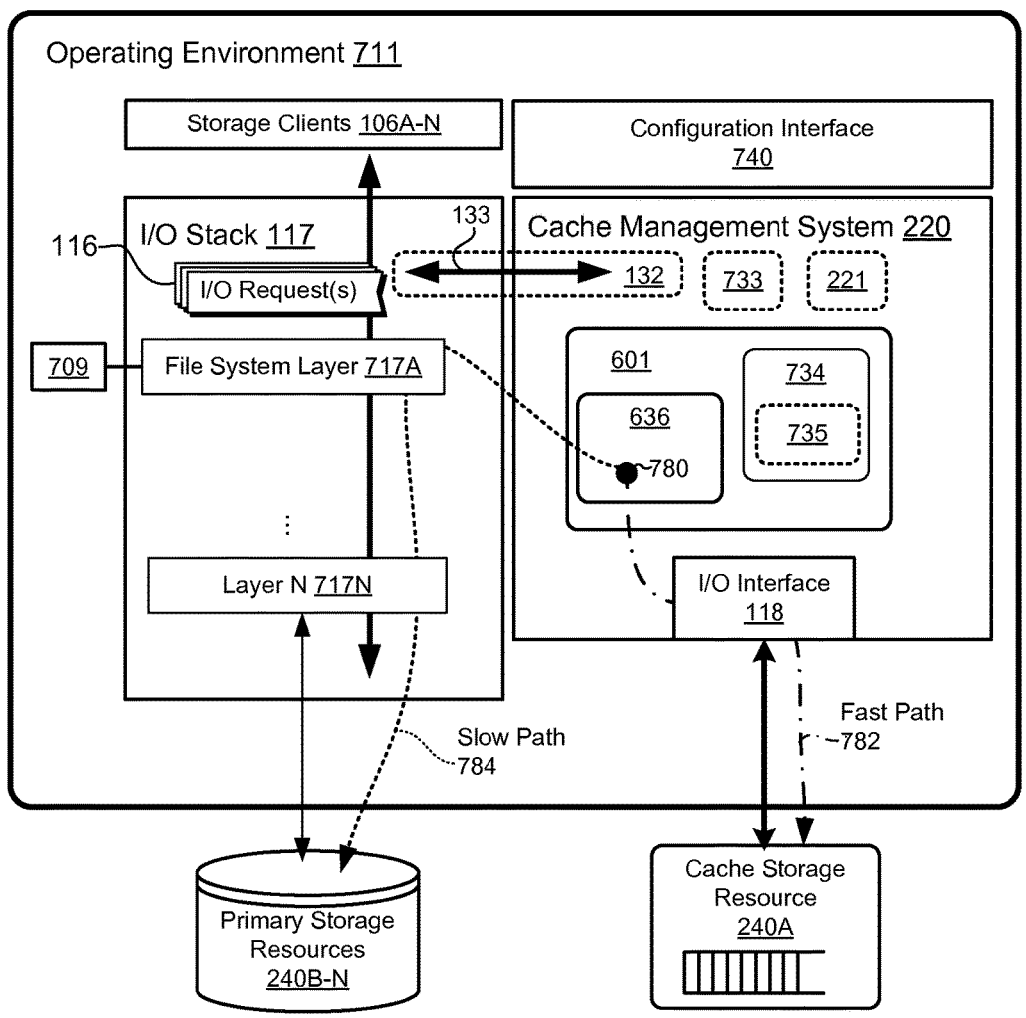
FIG. 7C depicts another embodiment of a cache management system.

FIG. 7C depicts another embodiment of a CMS 220. As described above, servicing a write I/O request 116 in an ephemeral cache mode may comprise writing data to a cache storage resource 240A without writing the data to a primary storage resource 240B-N (e.g., backing store). Accordingly, ephemeral cache operations may be implemented exclusively in a "fast path" 782 that is outside of the I/O stack 117 of the operating environment 711 and without involving operations on slower primary storage resources 240B-N. As used herein, a "fast path" operation refers to an I/O operation that occurs outside of the I/O stack 117 of the operating environment 711 and/or without involving slow primary storage resources 240B-N. A "slow path" operation refers to an I/O operation that involves one or more layers of the I/O stack 117 and/or is performed against one or more primary storage resources 240B-N.

Data stored in a non-ephemeral cache mode (e.g., write-through and/or write-back cache mode, as determined by the cache policy module 601 and/or persistence level module 734) may involve storing the data in both the cache storage resource 240A and/or one or more primary storage resources 240B-N. In response to a non-ephemeral cache mode I/O request 116, the cache execution module 636 may be configured to "fork" 780 the request into a fast path operation 782 to store the data in the cache storage resource 240A and a slow path operation 784 to store the data in one or more primary storage resources 240B-N. As used herein, a "fork" refers to invoking two or more separate processing operations (e.g., two or more processing threads). The CMS 220 may not acknowledge completion of the I/O request 116 until the slow path operation 784 is complete. Accordingly, the slow path 784 may determine the "critical path" for servicing non-ephemeral I/O requests 116. As used herein, a "critical path" refers to a processing path that determines the timing and/or latency for processing operations (e.g., the processing steps and/or path. The critical path for servicing non-ephemeral I/O requests 116 may comprise the slow path 784 since completion of such I/O requests 116 are not acknowledged until the corresponding data is stored on the one or more primary storage resources 240B-N.

By contrast, the cache execution module 636 may be configured to service write I/O requests 116 pertaining to ephemeral data (as determined by the cache policy module 601 and/or persistence level module 734) exclusively in a fast path 782, without involving slow path 784 operations within the I/O stack 117 and/or primary storage resources 240B-N. Moreover, servicing an I/O request 116 to write ephemeral cache data may not require the fork 780, since no separate slow path 784 processing is required. The CMS 220 may acknowledge completion of ephemeral I/O requests 116 in response to completion of the fast path operation 782, and without waiting for slow path 784 operations to complete. Therefore, ephemeral I/O requests 116 may reduce the critical path for servicing I/O requests 116 and reduce the load on the I/O stack 117 and/or primary storage resources 240B-N.

Figure 8A:
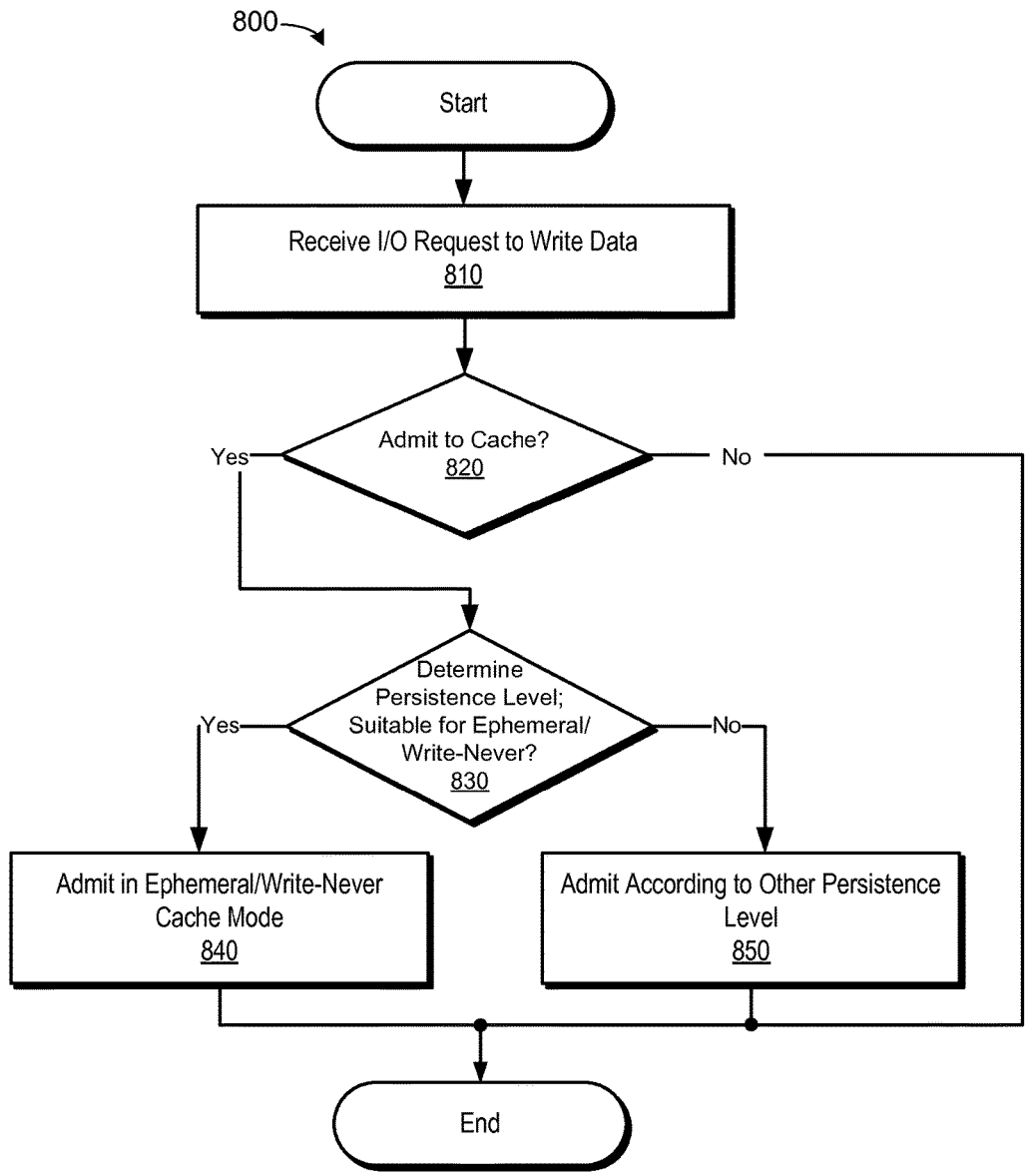
FIG. 8A is a flow diagram of one embodiment for caching data according to adaptive levels of persistence.

FIG. 8A is a flow diagram of one embodiment for caching data according to adaptive levels of persistence. The method 800 may start and be initialized as disclosed herein. Step 810 may comprise receiving an I/O request 116 at a storage module 130 and/or CMS 220. Step 810 may comprise receiving the I/O request 116 directly from a storage client 106A-N (e.g., via an I/O interface 131) and/or detecting and/or monitoring I/O requests within an I/O stack 117 (or other I/O infrastructure), as disclosed herein. Step 810 may further comprise accessing a context and/or identifier (e.g., file identifier) associated with the I/O request 116, as described herein.

Step 820 may comprise determining whether to admit data of the I/O request 116 into a cache, such as the virtual machine cache 213. However, the disclosure is not limited to virtual computing environments, and could be applied to bare-metal environments and/or non-virtualized cache resources. Step 820 may comprise determining whether data of the I/O request 116 has already been admitted; if so, the I/O request 116 may be serviced according to persistence metadata associated with the I/O request 116 (e.g., previously determined persistence level and/or cache mode of the I/O request 116 as indicated in a cache tag 221 of the I/O request 116). If data of the I/O request 116 is to be admitted (per cache policy and/or availability), the flow continues to step 830.

Step 830 may comprise assigning an adaptive persistence level to the I/O request 116, which may comprise selecting a cache mode for the I/O request 116 (e.g., ephemeral, write-through, write-back, or the like). Assigning the persistence level may comprise determining whether the I/O request 116 pertains to temporary and/or dispensable data, as described above. Accordingly, step 830 may comprise comparing file-level knowledge pertaining to the I/O request 116 to a persistence level criteria. For example, the I/O request 116 may be assigned an ephemeral cache mode if the I/O request 116 pertains to a swap file, temporary file, local cache file, or the like. Alternatively, the I/O request 116 may be assigned a write-through cache mode (or other cache mode, such as write-back) if the I/O request 116 pertains to permanent data. Step 830 may further comprise updating a cache tag 221 associated with the I/O request 116 to indicate the persistence level and/or cache mode determined at step 830 (e.g., updating persistence metadata of the cache tag 221). If the persistence level determined at step 830 indicates an ephemeral cache mode, the flow continues to step 840; otherwise, the flow continues to step 850.

Step 840 may comprise admitting data of the I/O request 116 into the cache in an ephemeral cache mode. Step 840 may comprise storing data of the I/O request 116 in a cache (e.g., the virtual machine cache 213), but not storing the data in a primary storage resource 240B-N. Accordingly, step 840 may comprise storing the data exclusively in the cache 216. In virtualized environments, step 840 may further comprise providing an indication to the virtual machine cache 213 that the data is being cached in an ephemeral cache mode. As described below, the virtual machine cache 213 may use cache mode metadata to determine whether to retain the cache data after the virtual machine 208A-N transfers to another host (and/or how long to retain the cache data). Since the virtual machine cache 213 may be the only source for ephemeral cache data, the virtual machine cache 213 may be configured to retain the ephemeral cache data until the data is transferred to the new host of the virtual machine 208A-N.

Step 850 may comprise admitting data of the I/O request 116 according to the persistence level determined at step 830, which may comprise storing the data in a shared virtual machine cache 213 (or other cache), writing the data through and/or back to one or more primary storage resources 240B-N, and so on.

Figure 8B:
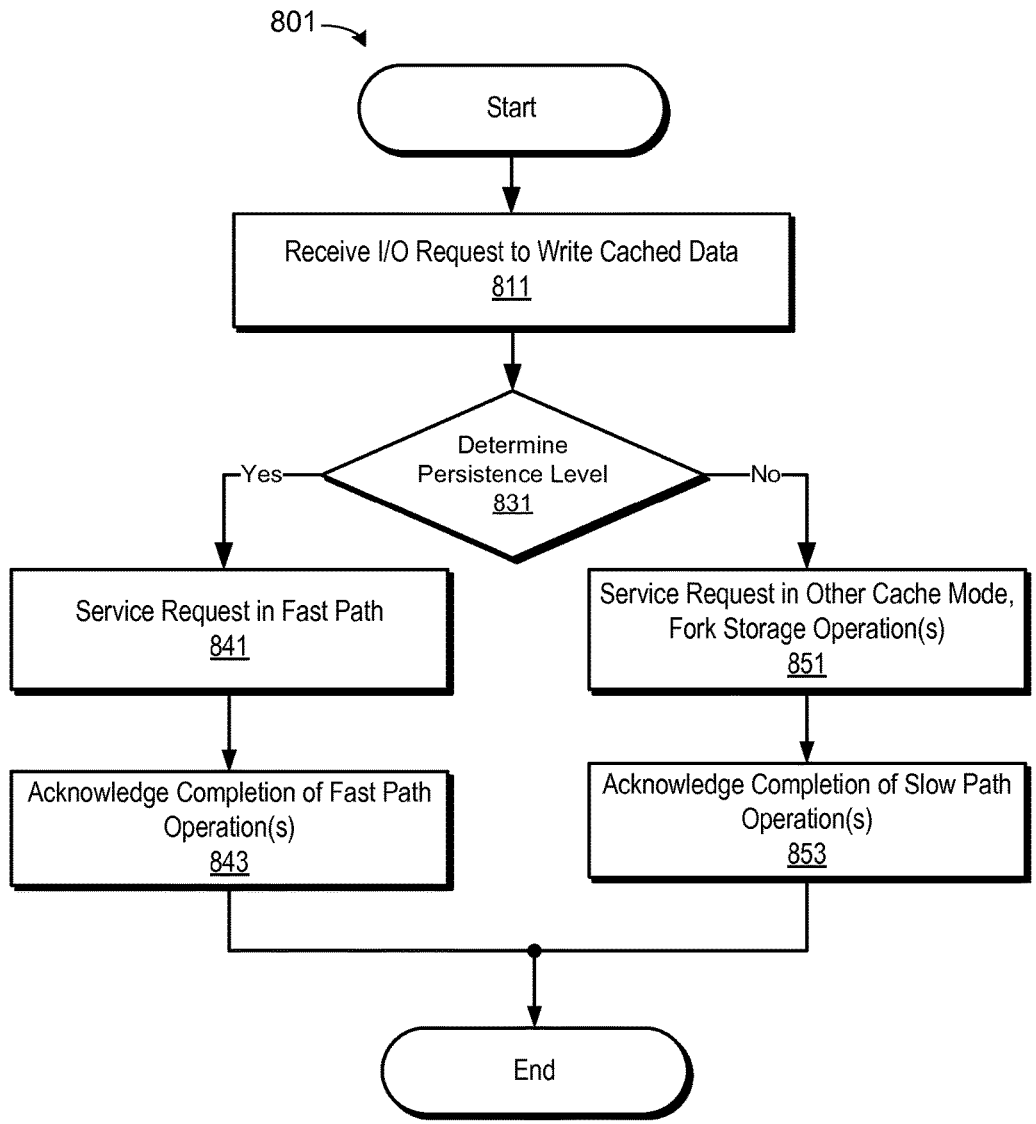
FIG. 8B is a flow diagram of another embodiment for caching data according to adaptive levels of persistence.

FIG. 8B is a flow diagram of another embodiment for caching data according to adaptive levels of persistence. The method 801 may start and be initialized as disclosed herein. Step 811 may comprise receiving an I/O request 116 to write data at a storage module 130 and/or CMS 220. Step 811 may comprise receiving the I/O request 116 directly from a storage client 106A-N (e.g., via an I/O interface 131) and/or detecting and/or monitoring I/O requests 116 within an I/O stack 117 (or other I/O infrastructure), as disclosed herein. Step 811 may further comprise determining that the I/O request 116 pertains to data that has been admitted into the cache (e.g., cache storage resource 240A and/or virtual machine cache 213).

Step 831 may comprise determining a persistence level associated with the I/O request 116, which, as described herein, may determine the cache mode of the I/O request 116. If the cache mode comprises an ephemeral cache mode, the flow continues to step 841; otherwise, the flow continues to step 851.

Step 841 may comprise servicing the I/O request 116 in an ephemeral cache mode. Accordingly, step 841 may comprise servicing the I/O request 116 in one or more fast path operations 782 that do not involve access to primary storage resources 240B-N and/or other layers of the I/O stack 117. Step 843 may comprise acknowledging completion of the I/O request 116 in response to completion of the one or more fast path operation(s) 782. Accordingly, the critical path for servicing the I/O request 116 only includes fast path operation(s) 782 and excludes a fork 780 for slow path operation(s) 784.

Step 851 may comprise servicing the I/O request 116 according to another, non-ephemeral cache mode, such as a write-through cache mode. Step 851 may comprise servicing the I/O request 116 in one or more slow path operations 784 and one or more fast path operations 782 (e.g., forking 780 the I/O operations). The one or more slow path 784 operations may comprise operations on one or more primary storage resources 240B-N and/or may involve one or more layers of the I/O stack 117. Step 853 may comprise acknowledging completion of the I/O request 116 in response to completion of the one or more slow path operations 784.

As disclosed above, the CMS 220 may be configured to maintain cache tags 221, which may represent an optimal working set of the cache per the application of one or more cache policies, such as cache admission policies, cache retention and/or eviction policies (e.g., cache aging metadata, cache steal metadata, LRU, "hotness" and/or "coldness," and so on), cache profiling information, file- and/or application-level knowledge, and the like. Accordingly, the working set may represent the set of cache data that provides optimal I/O performance for the virtual machine 208A-N under certain operating conditions. The working set may take considerable time to develop and/or refine.

The CMS 220 may be configured to retain the cache tags 221 in response to relocating, transferring, and/or migrating the virtual machine 208A-N to another host 202 (e.g., in a VMotion™ operation). Retaining the cache tags 221 may comprise maintaining the cache tags 221 in the memory of the virtual machine 208A-N and/or not invalidating the cache tags 221 during reallocation. Retaining the cache tags 221 may further comprise requesting cache storage from the cache provisioner module 214 of the new host 202 and/or selectively adding and/or removing cache tags 221 in response to being allocated a different amount of cache storage on the new host 202. In some embodiments, the CMS 220 may retain the cache tags 221 despite the fact that the cache data referenced by the cache tags 221 does not exist in the cache 216 of the new host 202. As described below, the virtual machine cache 213 may be configured to populate the cache 216 with cache data from a previous host 202 of the virtual machine 208A-N (e.g., via a network transfer) and/or from primary storage. Certain cache data, such as ephemeral cache data, may only be available from the previous host 202.

Migrating a virtual machine 208A-N may comprise reallocating cache resources on the new host, re-populating the cache, and so on. The cache data may be transferred from the previous host 202 of the virtual machine 208A-N and/or primary storage. However, certain types of cache data, such as ephemeral cache data, may only be available on the virtual machine cache 213 of the previous host 202A; since the cache data is not written-through and/or written-back to primary storage, the data only exists in the cache 213. As described herein, the virtual machine cache 213 may be configured to transfer cache data between hosts 202, such that the ephemeral cache data is not lost. Alternatively, or in addition, the CMS 220 of a virtual machine 208A-N may be configured to flush ephemeral cache data before being transferred and/or migrated to a new host 202, which may avoid data loss in the event the cache data is removed from the previous host 202 (and/or the previous host experiences a failure condition).

Figure 9:
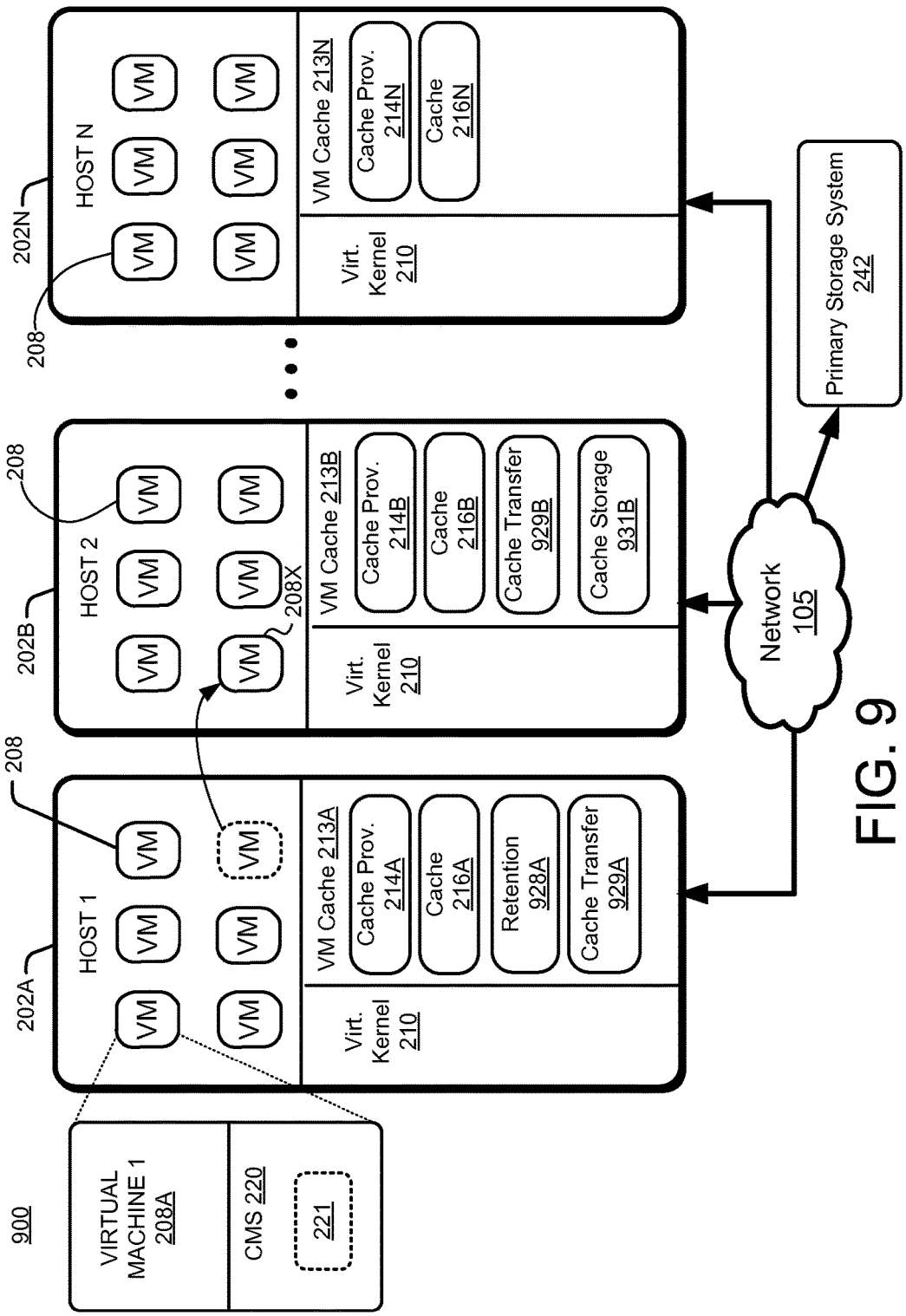
FIG. 9 is a block diagram of another embodiment of a virtual computing environment.

FIG. 9 is a block diagram of another embodiment of a virtual computing environment 900. The virtual computing environment 900 includes multiple hosts 202A-N, each of which may comprise a virtualization kernel 210 and one or more virtual machines. Although not shown in FIG. 2, each virtual machine may comprise a respective CMS 220, as described herein. Each host 202A-N may further comprise a respective virtual machine cache 213A-N, comprising a cache provisioner module 214 and cache 216. Although FIG. 9 depicts three host systems 202A-N, the disclosure is not limited in this regard and could include any number of hosts 202A-N.

The virtualized environment 900 may comprise a primary storage system 242, which may be shared among the hosts 202A-N and/or the virtual machines 208. The primary storage system 242 may comprise any suitable persistent storage device and/or storage system, including, but not limited to, one or more magnetic disks (e.g., hard drives), a redundant array of inexpensive disks (RAID), a storage area network (SAN), or the like. The hosts 202A-N may be configured to access the primary storage system via the network 105.

In some embodiments, each virtual machine 208 may be assigned a respective VMID. The VMID may be assigned when the virtual machine 208 is instantiated (e.g., loaded) on a host 202A-N (e.g., during a handshake protocol, described above). The VMID may comprise a process identifier, thread identifier, or any other suitable identifier. In some embodiments, the VMID may uniquely identify the virtual machine 208 on a particular host 202A-N and/or within a group of hosts 202A-N. For example, the hosts 202A-N may operate within the same namespace, such as a cluster, and the VMID of each virtual machine 208 may be unique within the namespace of the cluster (unique across the virtual machines 208A-N deployed on hosts 202A-N in the cluster). In some embodiments, the VMID may comprise a host identifier, such as a Media Access Control (MAC) address, network address, distinguished name, or the like. Accordingly, in some embodiments, a VMID may uniquely identify a virtual machine 208 in a particular namespace, and may identify the host 202A-N upon which the virtual machine 208 is current deployed (or was previously deployed). Alternatively, or in addition, each virtual machine 208 may be configured to maintain a current host identifier and a previous host identifier.

In some embodiments, one or more of the virtual machines 208A-N may be capable of being relocated and/or transferred between the hosts 202A-N. For example, a virtual machine 208X may be migrated from the host 202A to the host 202B (e.g., in a VMotion™ or similar operation). In some embodiments, the CMS 220 of the virtual machine 208X may be configured to detect a transfer and/or migration operation and, in response, may attempt to flush ephemeral cache data to the primary storage system 242. As described above, flushing ephemeral cache data may prevent data loss in the event the ephemeral cache data is unavailable from the previous host 202A. Alternatively, the CMS 220 may be configured to maintain the persistence level of ephemeral cache data to avoid "migration storms" (e.g., avoid overloading the primary storage 242 system and/or I/O infrastructure of the network 105).

The virtual machine cache 213B may be configured to identify the transfer in response to receiving a request from the CMS 220 of the transferred virtual machine 208X. The request may comprise the VMID of the transferred virtual machine 208X, from which the virtual machine cache 213B may determine that the virtual machine 208X is "new" to the host 208B (e.g., requests comprising the VMID have not been received before). In response, the virtual machine cache 213B may initiate a handshake protocol with the virtual machine 208X. The virtual machine cache 213B may determine that the virtual machine 208X was transferred to the host 208B based, at least in part, on a host identifier of the VMID, and/or host identifier(s) maintained by the virtual machine 208X. The host identifier of the virtual machine 208X may reference the host 202A, whereas the host identifier of a newly powered-on virtual machine 208 may reference the host 202B (or may be blank). Alternatively, or in addition, the virtual machine 208X may comprise a separate host identifier, which may reference host 202A, and may be accessed in the handshake protocol with the virtual machine cache 213B.

The cache provisioner module 214 may be configured to allocate storage for the virtual machine 208X in the cache 216B. The cache provisioner module 214 may be configured to determine how much cache storage to provision based, at least in part, upon the size of the cache storage allocated to the virtual machine 208X on the previous host (host 202A). As disclosed above, the CMS 220 of the virtual machine 208X may be configured to retain the working set of the cache (e.g., retain the cache tags 221) after the transfer to host 202B. The cache provisioner module 214B may attempt to allocate sufficient cache storage in the cache 216B to support the retained cache tags 221. If sufficient cache storage cannot be allocated, the CMS 220 may be configured to selectively remove the retained cache tags in accordance with the new cache storage allocation on host 202B. Alternatively, if excess cache storage is available, the CMS 220 may be configured to add new tags to the retained cache tags 221. The allocation may be reflected through a virtual disk 229, as described herein.

The virtual machine cache 213A may comprise a retention module 928A, which may be configured to retain cache data of the virtual machine 208X after the virtual machine 208X is transferred from the host 202A. The cache data may be retained for a retention period and/or until the virtual machine cache 213A determines that the retained cache data is no longer needed. The retention module 928A may determine whether to retain the cache data (and/or determine the cache data retention period) based upon various retention policy considerations, including, but not limited to, availability of cache 216A, availability of cache 216B, relative importance of the retained cache data (as compared to cache requirements of other virtual machines 208), whether the cache data is backed up in the primary storage system 242, a cache mode and/or persistence level of the cache data, and so on. For example, cache data stored in an ephemeral cache mode may only be available on the original virtual machine cache 213A. Therefore, the cache retention module 928A may be configured to prioritize retention of ephemeral cache data until the ephemeral cache data is transferred to the new host 202B. By contrast, cache data stored in different cache modes (e.g., write-through and/or write-back cache mode) may have a lower retention priority, since this data will be available from the primary storage system 242.

The CMS 220 of the virtual machine 208X may be configured to retain the working state of the cache (the cache tags 221) despite the fact that the cache 216B does not comprise the cache data to which the cache tags 221 refer. As disclosed below, the virtual machine cache 213B may be configured to populate the cache 216B with cache data transferred from the cache 216A of host 202A and/or the primary storage system 242, to reconstruct the working set of the transferred virtual machine 208X.

The virtual machine cache 213B may comprise a cache transfer module 929B, which may be configured to access cache data of the virtual machine 208X stored at the previous host 202A. The cache transfer module 929B may be configured to identify the previous host 202A by use of the VMID and/or by interrogating the virtual machine 208X (e.g., accessing a previous host identifier maintained by the virtual machine 208X). The cache transfer module 929B may use the host identifier to issue one or more requests for the cache data to the virtual machine cache 213 of the host 202A via the network 105. In some embodiments, the cache transfer module 929B is configured to determine and/or derive a network address or network identifier of the host 202A from the host identifier.

The virtual machine cache 213A may comprise a cache transfer module 929A that is configured to selectively provide access to retained cache data of the transferred virtual machine 208X. In some embodiments, the cache transfer module 929A is configured to secure the retained cache data. For example, the cache transfer module 929A may be configured to verify that the requesting entity (e.g., the virtual machine cache 213B) is authorized to access the cache data of the transferred virtual machine 208X, which may comprise verifying that the virtual machine 208X is deployed on the host 202B. For example, the cache transfer module 929A may request a credential associated with the transferred virtual machine 208X, such as the VMID or the like. Alternatively, or in addition, the cache transfer module 929A may implement a cryptographic verification, which may comprise verifying a signature generated by the transferred virtual machine 208X or the like.

The cache transfer module 929B may be configured to transfer the cache data by one or more demand paging transfers, prefetch transfers, and/or bulk transfers. A demand paging transfer may comprise transferring cache data in response to I/O requests 116 for the cache data from the virtual machine 208X (e.g., on demand). The transferred data may be used to service the I/O requests 116. In addition, the transferred data may be admitted into the cache 216B of the new host 202B. Alternatively, the transferred data may be admitted at a later time (not not at all), in accordance with cache policy.

A prefetch transfer may comprise transferring data according to a prefetch cache policy (e.g., by proximity or the like) and/or persistence level of the cache data. The amount and/or extent of cache data to prefetch may be determined by, inter alia, cache metadata of the CMS 220 (e.g., cache aging metadata, "hotness," and so on). Accordingly, in some embodiments, the cache transfer module 929B may be configured to query the CMS 220 to identify the cache data to prefetch (if any).

A bulk transfer may comprise transferring cache data in bulk, independent of storage requests from the virtual machine 208X. A bulk transfer may comprise transferring populating the entire cache storage allocated to the virtual machine 208X. Alternatively, a bulk transfer may comprise populating a subset of the cache, which, as disclosed above, may be selected based upon cache metadata of the virtual machine CMS 220.

The cache transfer module 929B may be further configured to prioritize cache transfers (e.g., prefetch and/or bulk transfers) in accordance with the persistence level of the cache data. For example, data that is cached in an ephemeral cache mode may only be available from the previous host 202A, and as such, may be prioritized over other cache data that may be available from alternative sources (e.g., primary storage system 242). Therefore, the cache transfer module 929B may be configured to prefetch and/or bulk transfer ephemeral cache data rather than waiting for on-demand paging and/or transferring other data.

The cache storage module 931B may be configured to store cache data transferred from the cache 216A of the host 202A (or acquired from other sources, such as the primary storage system 242) in the cache 216B. The cache storage module 931B may be configured to store the cache data at cache storage locations that have been allocated to the transferred virtual machine 208X by the cache provisioner module 214B. The cache data may be stored at the same cache storage location (e.g., same offset with the cache storage) as in the original cache 216A, such that the references in the retained cache tags 221 remain valid per the mappings implemented by the map module 514 of the cache provisioner module 214.

In response to requests for cache data, the cache transfer module 929A may be configured to identify the requested cache data using, inter alia, the VMID of the transferred virtual machine 208X (by use of the map module 514). The cache transfer module 929A may then transfer the requested cache data (if available) to the cache transfer module 929B via the network 105.

The cache transfer module 929B may be configured to access cache data from the previous host 202A. Data cached in an ephemeral cache mode may only be accessible from the previous host 202A. Data cached in other cache modes may be available from other sources, such as the primary storage system 242, and/or other sources of the data (e.g., other persistent storage systems, hosts 202N, or the like). The cache transfer module 929B may select the source of the cache data based upon various policy considerations (e.g., a cache transfer policy), which may include a network policy, bandwidth policy, host resource policy, primary storage resource policy, and the like. For example, in response to determining that the network 105 is highly congested, the cache transfer module 929B may be configured to reduce the amount of data to transfer (defer a bulk transfer) and/or transfer the cache data from another source that is independent of the network 105. Similarly, the cache transfer module 929B may direct requests to the host 202 (as opposed to the primary storage system 242) in response to determining that the primary storage system 242 is heavily loaded and/or has limited available bandwidth.

The cache data retained on the host 202A may represent cache resources that cannot be used by the other virtual machines 208A-N operating on the host 202A. As such, the cache retention module 928A may be configured to selectively remove the retained cache data when the data is no longer needed and/or according to a retention policy. The retention policy may be determined based upon the retention policy factors, described above. In some embodiments, the cache transfer module 929B is configured to inform the previous host 202A of cache data that has been transferred to the host 202B from other sources so that the cache retention module 928A can remove the corresponding data from the cache 216A. The cache transfer module 929B may be further configured to inform the host 202A of other conditions in which the cache data no longer needs to be retained, such as when the cache data is overwritten, deleted (e.g., trimmed), evicted from the cache 216B, or the like. As disclosed above, the cache retention module 928A may be configured to prioritize cache retention based on the persistence level of the cache data, such that the retention of ephemeral cache data is prioritized over cache data available from other sources.

In some embodiments, the cache transfer module 929A may be configured to "push" cache data of the virtual machine 208X to the new host 202B. Pushing cache data may comprise transferring retained cache data of the virtual machine 208X to the cache transfer module 929B without receiving a request for the cache data (independent of requests for the cache data). The cache transfer module 929A may determine the host identifier of the new host 202B through user configuration; the verification process, described above; active polling by the cache transfer module 929A; a call-back implemented by the transferred virtual machine 208X; or the like. In some embodiments, the virtual machine cache 213 of the new host 202B may identify that the virtual machine 208X was transferred from the host 202A in response to receiving cache data pushed from the host 202A, as described above. The cache transfer module 929A may be configured to selectively push high-priority cache data, such as ephemeral cache data to prevent data loss.

Figure 10:
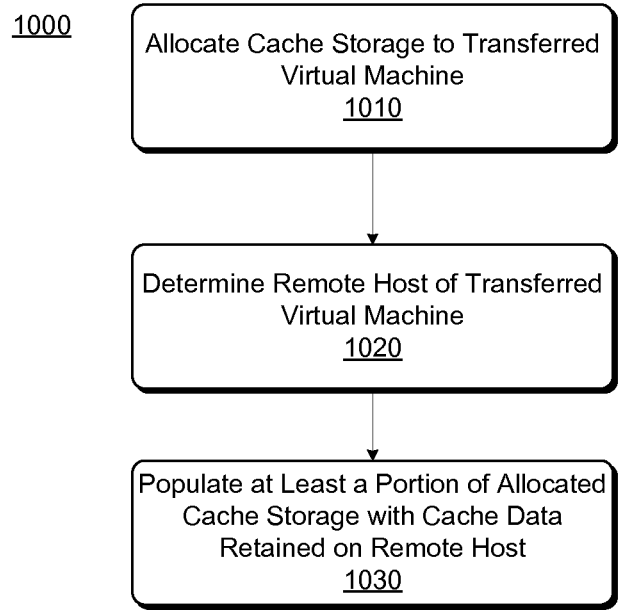
FIG. 10 is a flow diagram of one embodiment of a method for transferring cache data.

FIG. 10 is a flow diagram of one embodiment of a method 1000 for transferring and/or migrating cache data of a virtual machine 208 between hosts 202. The method 1000 may start and be initialized, as described above.

Step 1010 may comprise a cache provisioner module 214B allocating cache storage to a virtual machine 208X on a host 208B in response to the virtual machine 208X migrating to the new host 202B from a previous host 202A. The new host 202B and the previous host 202A may be communicatively coupled (e.g., via a network 105). As described above, the cache provisioner module 214B may identify the transferred virtual machine 208X in response to receiving an I/O request 116 from the CMS 220 of the virtual machine 208X (or other query), receiving cache data of the virtual machine 208X from the cache transfer module 929A of the previous host 202A, or the like. Step 1010 may further comprise distinguishing the transferred virtual machine 208X from an initial power-on and/or restart condition (e.g., based on the VMID of the virtual machine 208X, a host identifier, or the like). The cache may be dynamically allocated to the virtual machine 208X in a virtual disk 229 via a virtual disk driver 215, as described above.

Step 1020 may comprise the cache transfer module 929B of the new host 202B determining the previous host 202A of the transferred virtual machine 208X. Step 1020 may comprise accessing a host identifier in the VMID of the virtual machine 208X, querying the transferred virtual machine 208X, receiving pushed cache data from the previous host 202B, or the like, as described above.

Step 1030 may comprise populating at least a portion of the cache storage allocated to the virtual machine 208X with cache data retained at the remote host 202A, as described above. The cache data may correspond to cache data stored in an ephemeral cache configuration that is only available at the previous host 202. Step 1030 may comprise requesting the cache data, verifying that the new host 202B is authorized to access the cache data, receiving the cache data in a push operation, or the like. Cache data may be requested, transferred, and/or pushed according to a cache transfer policy of the cache transfer modules 929A and/or 929B, as described above. In some embodiments, step 1030 further comprises populating the allocated cache storage with data accessed from primary storage 212 (or another source). Step 1030 may further comprise informing the remote host 202A that the retained cache data of the virtual machine 208X no longer needs to be retained in response to populating the cache on the new host 202B, as described above.

Figure 11:
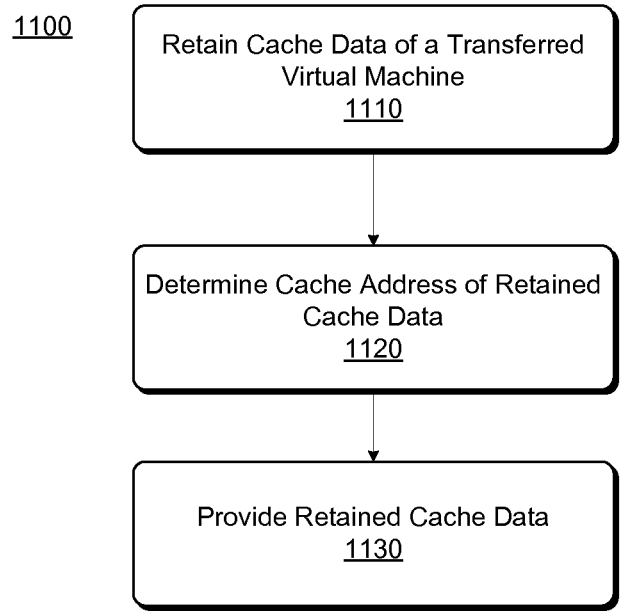
FIG. 11 is a flow diagram of another embodiment of a method for transferring cache data.

FIG. 11 is a flow diagram of one embodiment of a method 1100 for transferring cache data of a virtual machine 208A-N. The method 1100 may start and be initialized, as described above.

Step 1110 may comprise retaining cache data of a virtual machine 208X in a cache 216 (cache storage device) in response to transferring and/or migrating the virtual machine 208X off of the host 202A. The cache data may be retained by a cache retention module 928A in accordance with a retention policy, as described above. In some embodiments, step 1110 may comprise prioritizing retention of ephemeral cache data, which may not be available on primary storage system 242 (e.g., may only be available within the virtual machine cache 213A of the previous host 202A).

Step 1120 may comprise determining a cache address of the retained cache data in response to a request for the cache data. The cache address may be based, at least in part, on a VMID of the transferred virtual machine. The cache address of the data may be determined by a map module 514 configured to associate cache resources (e.g., cache chunks 302) with the virtual machines 208A-N to which the resources are allocated.

Step 1130 may comprise providing retained cache data, as described above. Step 1130 may comprise responding to requests for the cache data from a cache transfer module 929B of the new host 202B of the virtual machine 208X, pushing the cache data to the cache transfer module 929B, or the like.

Figure 12:
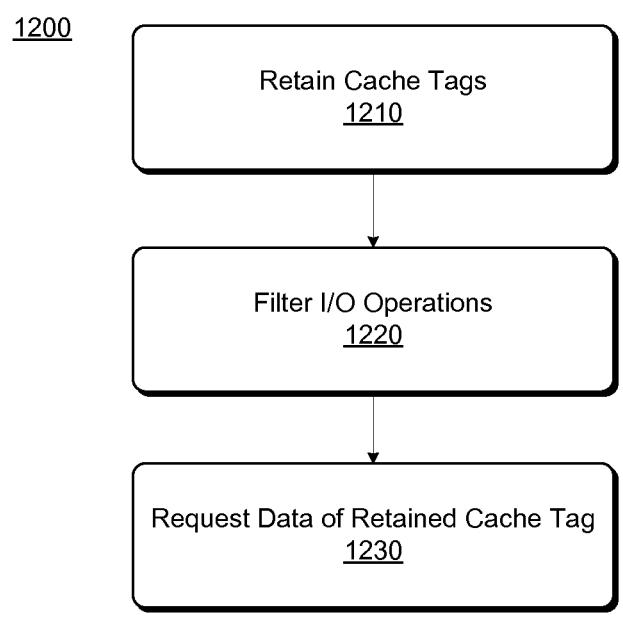
FIG. 12 is a flow diagram of another embodiment of a method for transferring cache data.

FIG. 12 is a flow diagram of another embodiment for transferring cache data of a virtual machine. Step 1210 may comprise retaining cache tags 221 in response to transferring the virtual machine 208X to a new host 202B. In some embodiments, step 1210 may comprise changing the persistence level of portions of the cache data. For example, the CMS 220 of the virtual machine 208X may be configured to flush ephemeral cache data to primary storage system 242, so that the cache data will be accessible at the new host 208B even if the cache data is removed from the virtual machine cache 213A of the current host 202A of the virtual machine 208X.

Step 1220 may comprise filtering I/O operations and directing selected I/O requests 116 to a CMS 220 in accordance with the retained cache tags 221. Step 1220 may comprise requesting data of one or more cache tags 221 that have not yet been transferred to the new host 202B of the virtual machine 208X and/or have not been allocated to the virtual machine 208X. As described above, in response to such a request, the virtual machine cache 213B of the new host 202B may identify the virtual machine 208X as a transferred virtual machine (e.g., as opposed to an initial boot up or power on), allocate cache storage for the virtual machine 208X, determine the previous host 202A of the virtual machine 208X, and/or transfer cache data from the previous host 202A (via the cache transfer module 929B).

Step 1230 may comprise requesting data of a retained cache tag, as described above. Requesting access may comprise performing an on-demand transfer of cache data from the previous host 202A to the virtual machine cache 213B of the new host 202B.

Reference throughout this specification to features, advantages, or similar language does not imply that all of the features and advantages that may be realized are included in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the features, advantages, and characteristics described herein may be combined in any suitable manner in one or more embodiments. One skilled in the relevant art will recognize that the disclosed embodiments may be practiced without one or more of the specific features or advantages of a particular embodiment. In other instances, additional features and advantages may be recognized in certain embodiments that may not be present in all embodiments. These features and advantages of the disclosed embodiments will become more fully apparent from the following description and appended claims, or may be learned by the practice of the embodiments as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic devices, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, magnetic tape, a Bernoulli drive, a magnetic disk, a punch card, flash memory, integrated circuits, or other digital processing apparatus memory device.

Furthermore, the features, structures, or characteristics disclosed herein may be combined in any suitable manner in one or more embodiments. In the following description, numerous specific details are provided, such as examples of programming, software modules, user selections, network transactions, database queries, database structures, hardware modules, hardware circuits, and hardware chips, to provide a thorough understanding of the disclosed embodiments. One skilled in the relevant art will recognize, however, that the teachings of the disclosure may be practiced without one or more of the specific details, or with other methods, components, materials, and so forth. In other instances, well-known structures, materials, or operations are not shown or described in detail to avoid obscuring aspects of the disclosed embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

We claim:

1. A method, comprising:
   selecting levels of persistence for input/output (I/O) requests to service by use of a storage system comprising an I/O stack and a plurality of storage devices, the storage devices including persistent storage devices accessed via the I/O stack and a designated storage device accessed outside of the I/O stack, separate from the persistent storage devices, wherein the levels of persistence are selected from a plurality of levels of persistence, including a first level of persistence corresponding to a limited storage duration without redundancy in the storage system; and
   servicing the I/O requests at the storage system in accordance with the selected levels of persistence, wherein servicing particular I/O requests pertaining to a particular file in accordance with the first level of persistence comprises:
      writing data of the particular file to the designated storage device via a fast path outside the I/O stack and without accessing the I/O stack, wherein the data of the particular file is written to the designated storage device without writing the data to any of the persistent storage devices, and the data of the particular file is evicted from the storage system without accessing any of the persistent storage devices of the storage system.

2. The method of claim 1, wherein:
   a second one of the plurality of levels of persistence corresponds to one or more of the persistent storage devices; and
   servicing an I/O request to write specified data to the storage system in accordance with the second level of persistence comprises writing the specified data to the one or more of the persistent storage devices utilizing a slow path within the I/O stack.

3. The method of claim 2, wherein:
   the second level of persistence specifies a configuration for the one or more of the persistent storage devices; and
   servicing the I/O requests in accordance with the second level of persistence comprises configuring the one or more of the persistent storage devices to store the specified data in the specified configuration.

4. The method of claim 2, wherein:
   the second level of persistence specifies a storage mode for the one or more of the persistent storage devices; and
   servicing the I/O requests in accordance with the second level of persistence comprises configuring the one or more of the persistent storage devices to the specified data in the specified storage mode.

5. The method of claim 2, wherein:
   the second level of persistence specifies redundant storage of the I/O request data on two or more of the persistent storage devices; and
   servicing the I/O request in accordance with the second level of persistence comprises storing the specified data redundantly on the two or more of the persistent storage devices.

6. The method of claim 1, wherein the data of the particular file is evicted from the designated storage device via one or more of a reboot, a restart, and a shutdown of a client associated with the particular file.

7. The method of claim 1, further comprising monitoring I/O requests in a storage stack to identify the I/O requests.

8. An apparatus comprising:
   means for receiving storage requests to implement by use of a storage system comprising an input/output (I/O) stack and a plurality of storage resources, the storage resources including persistent storage resources accessed via the I/O stack and a temporary storage resource accessed outside of the I/O stack, separate from the persistent storage resources;
   means for assigning respective persistence levels to the storage requests based on one or more characteristics of the storage requests, each persistence level corresponding to one or more of the storage resources of the storage system, the persistence levels including a first persistence level corresponding to a limited storage duration without redundancy in the storage system; and
   means for implementing the storage requests on selected storage resources of the storage system, wherein the storage resources are selected based on the persistence levels assigned to the storage requests, implementing particular storage requests pertain to a particular data set, and assigning the first persistence level comprises:
      writing data of the particular data set to the temporary storage resource via a fast path outside the I/O stack, separate from the plurality of persistent storage resources and without accessing the I/O stack, and
      evicting the data of the particular data set from the temporary storage resource using one or more of a reboot, a restart, and a shutdown of a client and without writing the data of the particular data set to the persistent storage resources of the storage system, such that the data of the particular data set is written to the temporary storage resource via the fast path outside of the I/O stack and evicted from the storage system without accessing the I/O stack and the persistent storage resources of the storage system.

9. The apparatus of claim 8, wherein:
a second one of the persistence levels specifies a write-through caching mode, and
storing a data unit within the storage system in response to a write request assigned the second persistence level comprises writing the data unit to the temporary storage resource and to one or more of the persistent storage resources utilizing a slow path within the I/O stack.

10. The apparatus of claim 8, further comprising means for assigning the first persistence level to the storage requests pertaining to the particular data set in response to determining that the data of the particular data set does not need to be retained within the storage system after one or more of a reboot, a restart, and a shutdown of the client.

11. The apparatus of claim 8, wherein:
writing the data of the particular data set to the temporary storage resource comprises admitting the data of the particular data set into a cache on the temporary storage resource, and
evicting the data of the particular data set from the storage system comprises evicting the data from the cache without writing the data of the particular data set to any of the persistent storage resources of the storage system.

12. The apparatus of claim 8, wherein
a second one of the persistence levels comprises caching data on the temporary storage resource in one or more of a write-back cache mode and a write-through cache mode and the apparatus further comprises:
means for implementing a write request to store a data unit within the storage system, the write request assigned the second persistence level, by:
caching the data unit on the temporary storage resource; and
writing the data unit to one or more of the persistence storage resources before an eviction of the data unit from the temporary storage resource.

13. The apparatus of claim 8, further comprising means for acknowledging completion of a storage request to write a data unit to the particular data set in response to storing the data unit on the temporary storage resource and without storing the data unit on any of the persistent storage resources of the storage system.

14. The apparatus of claim 8, wherein:
the first persistence level specifies a first error-correction code encoding; and
a second one of the persistence levels specifies a second, different error-correction code encoding.

15. An apparatus, comprising:
a request receiver configured to receive storage requests; and
a storage controller configured to:
interface with a plurality of storage resources of a storage system, the storage resources of the storage system comprising an input/output (I/O) stack, persistent storage devices accessed via the I/O stack, and a separate storage device accessed outside of the I/O stack,
assign persistence levels to the storage requests based on characteristics of the storage requests, the persistence levels including a first persistence level to assign to storage requests pertaining to data for temporary storage within the storage system without redundancy, and
store data within the storage system in response to the storage requests and according to the persistence levels assigned to the storage requests, wherein storing data within the storage system in response to particular storage requests assigned the first persistence level and pertaining to a specified data, comprises:
storing the specified data on the separate storage device via a fast path outside of the I/O stack without accessing the persistent storage devices of the storage system and without accessing the I/O stack, and
evicting the specified data from the separate storage device without writing the specified data to the persistent storage devices of the storage system via the I/O stack, such that the specified data is stored on the separate storage device without accessing the I/O stack and is evicted from the storage system without accessing the persistent storage devices of the storage system and without accessing the I/O stack.

16. The apparatus of claim 15, wherein the storage controller is further configured to cache the specified data in a write-never cache mode.

17. The apparatus of claim 15, wherein:
a second one of the persistence levels comprises storing data in a first redundant array of inexpensive disks (RAID) configuration; and
a third one of the persistence levels comprises storing data in a second RAID configuration that is different from the first RAID configuration.

18. The apparatus of claim 15, wherein the storage controller is configured to evict the specified data from the separate storage device via one or more of a reboot, a restart, and a shutdown of a client.

19. The apparatus of claim 18, wherein the client comprises a virtual machine operating on a host computing device.

20. The apparatus of claim 15, wherein the storage controller is configured to assign persistence levels to storage requests in response to comparing files associated with the storage requests to persistence levels.

* * * * *